United States Patent [19]

Matsuoka et al.

[11] Patent Number: 4,704,643
[45] Date of Patent: Nov. 3, 1987

[54] MAGNETIC TAPE RECORDING AND/OR REPRODUCING APPARATUS

[75] Inventors: Kaoru Matsuoka, Osaka; Tadashi Maeoka, Neyagawa; Jirou Kajino, Neyagawa; Hitoshi Minabe, Neyagawa; Tetsurou Tanaka, Hirakata, all of Japan

[73] Assignee: Matsushita Electric Industrial Co., Osaka, Japan

[21] Appl. No.: 829,817

[22] Filed: Feb. 14, 1986

[30] Foreign Application Priority Data

Feb. 18, 1985 [JP] Japan .................. 60-29520

[51] Int. Cl.$^4$ .............................................. G11B 5/008
[52] U.S. Cl. ........................................................ 360/71
[58] Field of Search .......................................... 360/71

[56] References Cited

U.S. PATENT DOCUMENTS 3,979,772 9/1976 Limeda ............................ 360/85
4,611,251 9/1986 Yokoo ............................. 360/85

FOREIGN PATENT DOCUMENTS 56-114154 9/1981 Japan .

Primary Examiner—George G. Stellar

[57] ABSTRACT

A magnetic tape recording and/or reproducing apparatus is provided with a motor for driving a capstan, a cassette loading mechanism for loading a tape cassette at a predetermined position, a tape loading mechanism reciprocable between an inoperative position where the tape is ready be drawn out from the tape cassette and an operative position where the tape is drawn out and wound onto a guide drum, an operating mode changing mechanism driven by the motor for changing operating mode of the apparatus, a reel turntable driving mechanism for transmitting a rotational driving force of the motor to reel turntables, and a clutch for transmitting intermittently the driving force of the motor to the cassette loading, tape loading and operating mode changing mechanisms, whereby cassette loading operation, tape loading operation, operating mode changing operation and tape transporting operation and performed by the single motor.

12 Claims, 24 Drawing Figures

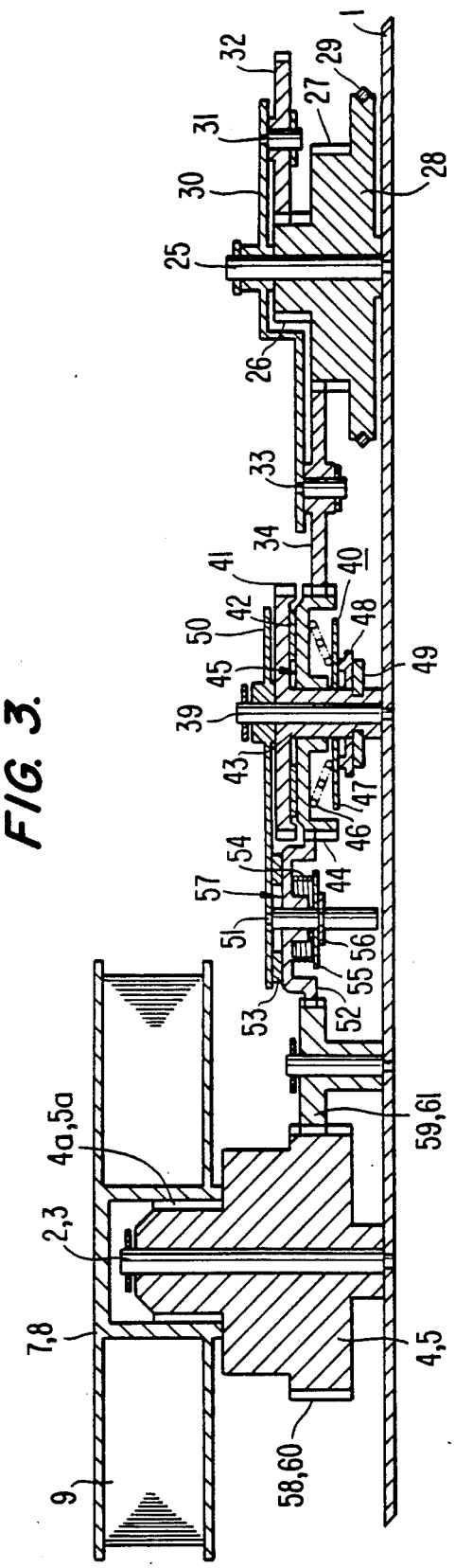
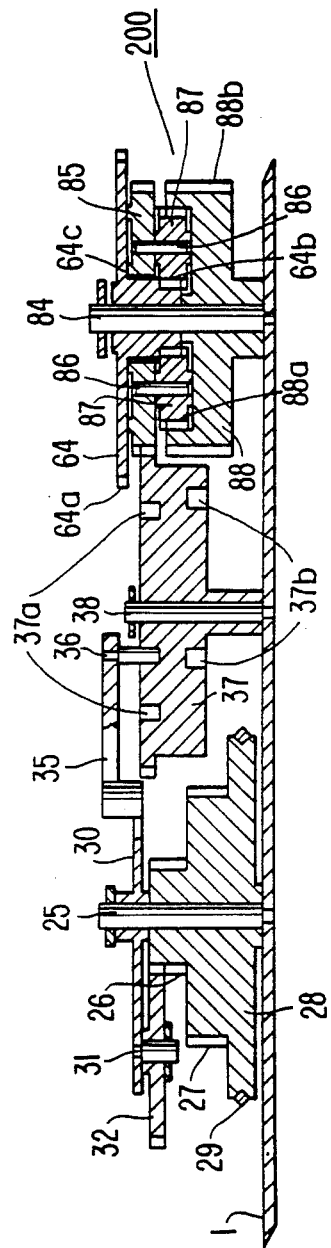
FIG. 3.
FIG. 4.

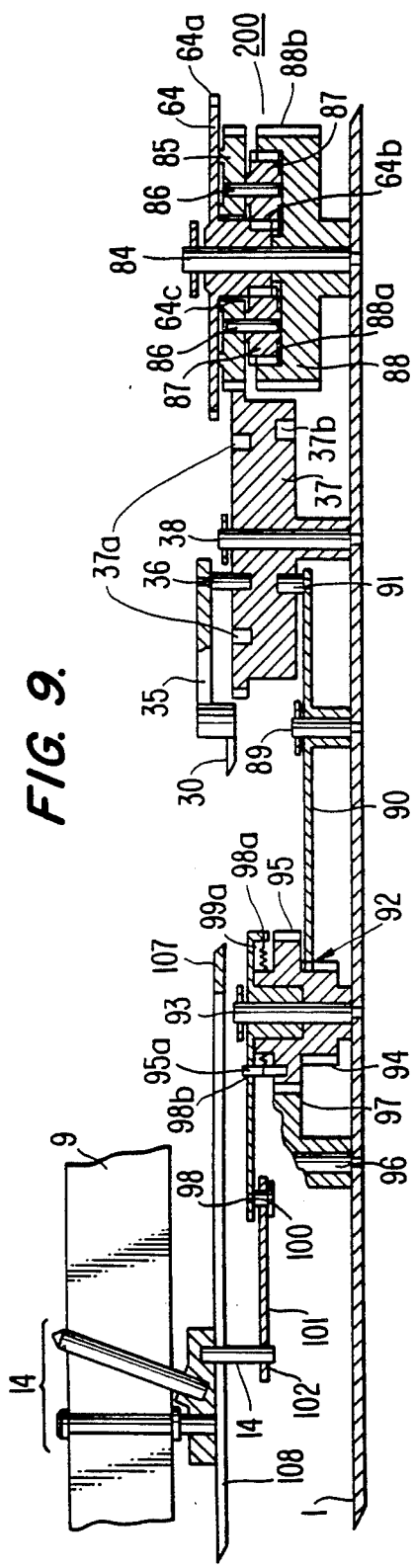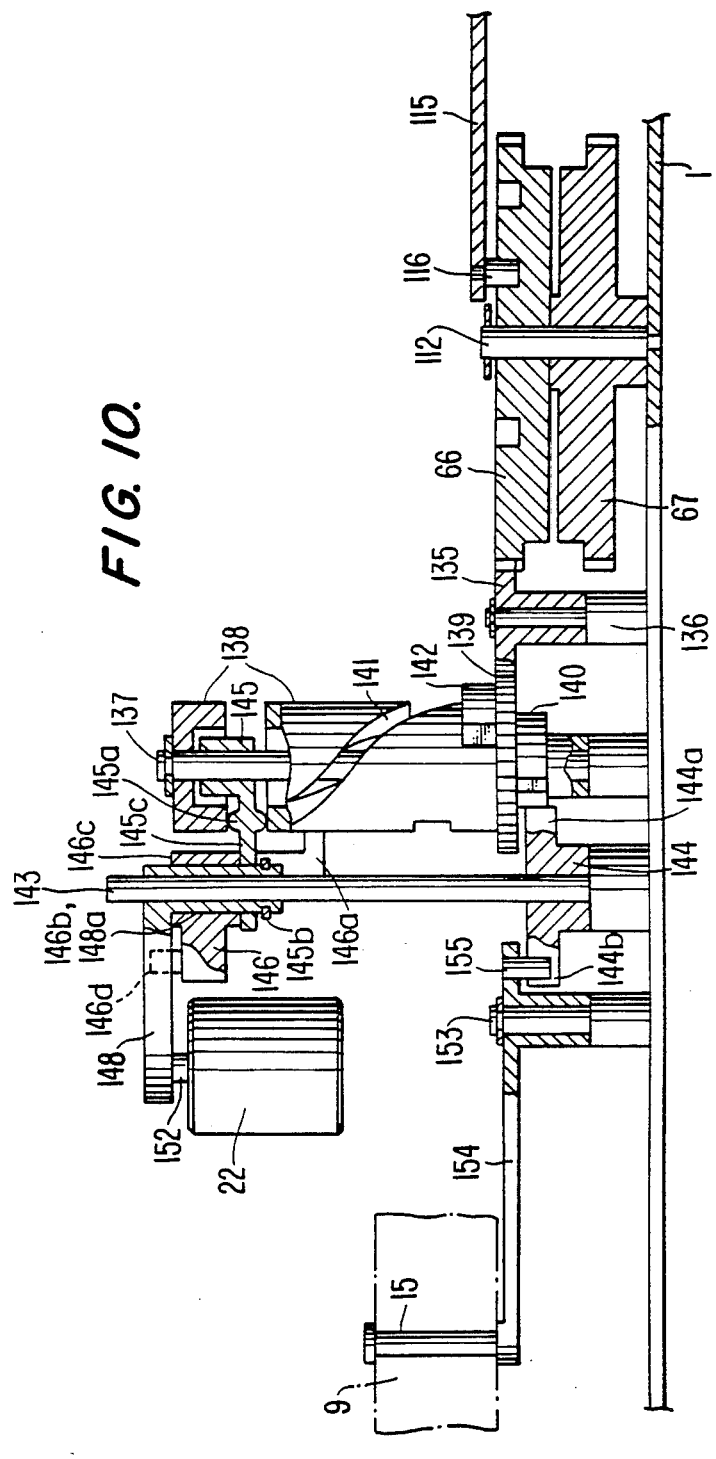

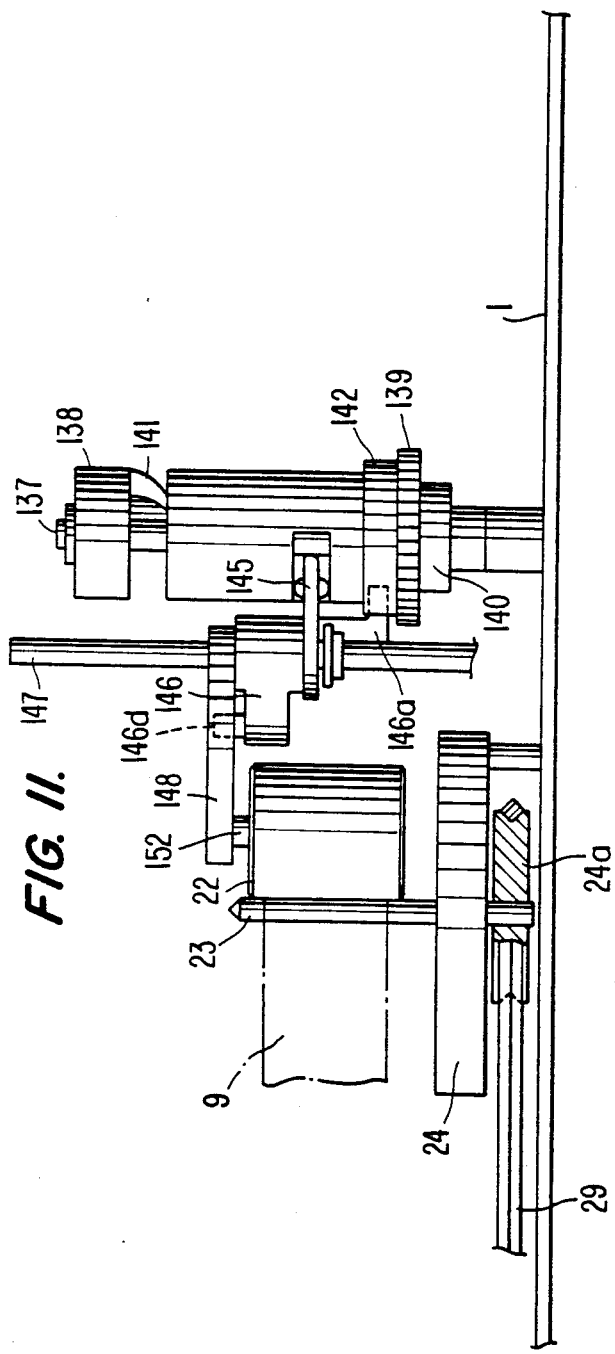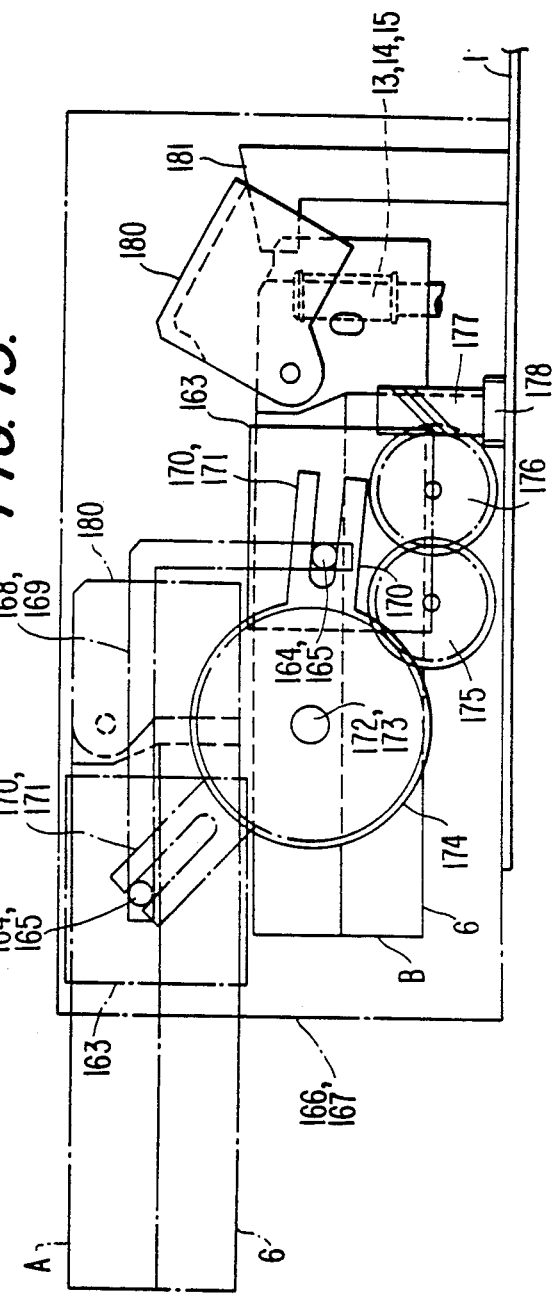

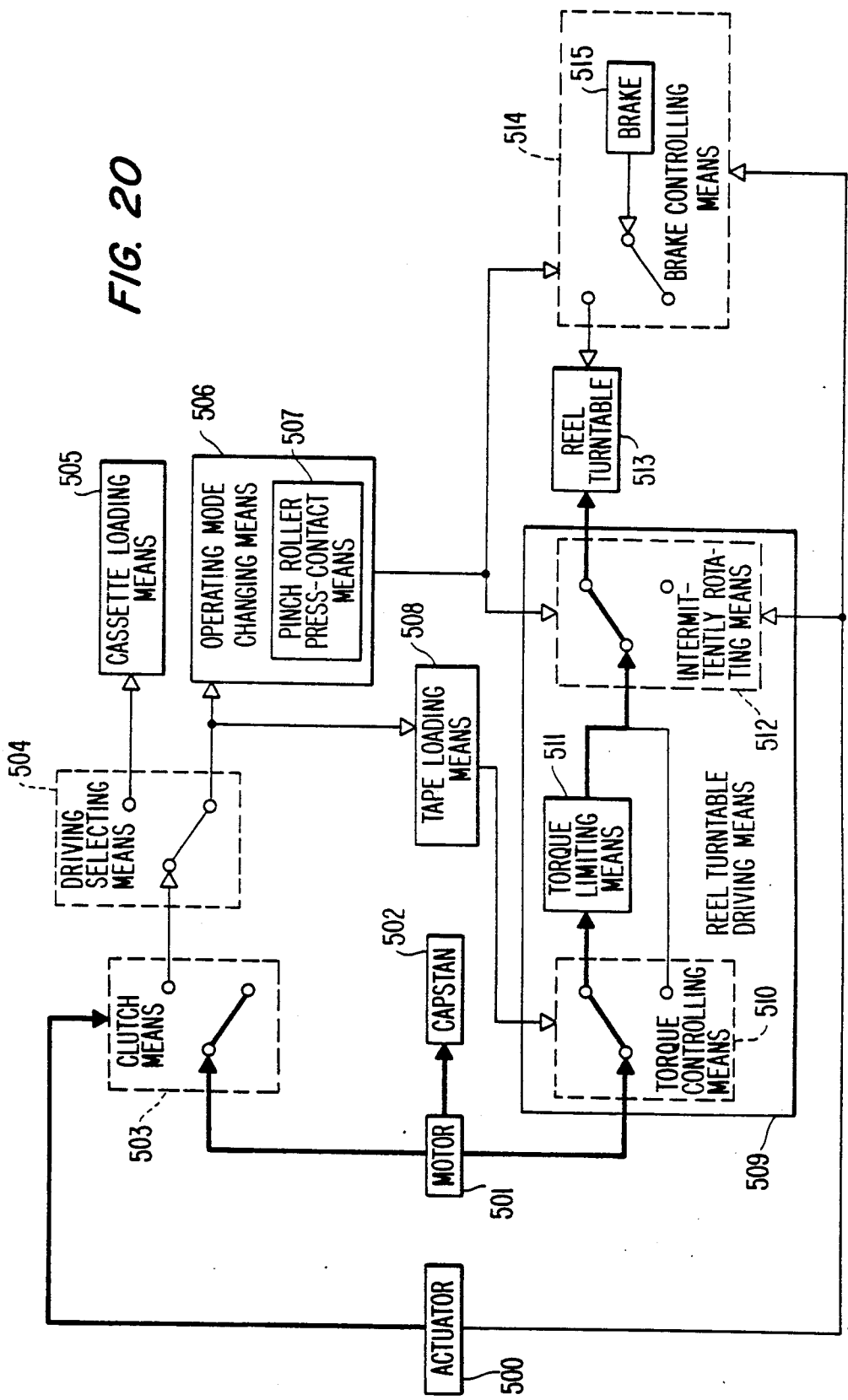

MAGNETIC TAPE RECORDING AND/OR REPRODUCING APPARATUS

BACKGROUND OF THE INVENTION

1. Field of the Invention

This invention relates to a magnetic tape recording and/or reproducing (MTRR) apparatus of the automatic tape-loading and -unloading type such as a video cassette recorder and an audio tape recorder, wherein a magnetic tape is drawn out of a tape cassette and wound at a predetermined angle around a guide drum positioned outside the tape cassette and carrying a magnetic head for recording and/or reproducing signals on/from the magnetic tape.

2. Description of the Prior Art

Recently a construction which can decrease the number of motors for driving the MTRR apparatus has been proposed for answering the increasing demand for low cost, light weight, and low power consumption MTRR apparatuses. Japanese Laid-Open Patent Application No. 56-114154 discloses a construction which drives with one motor both operating mode changing means for changing conditions of the MTRR apparatus and tape loading means for drawing a magnetic tape out of a tape cassette and winding it at a predetermined angle around a guide drum carrying a rotary magnetic head. Although this construction makes it possible to drive with one motor both the tape loading means and the operating mode changing means for operations such as, a pinch roller press-contact operation (a pinch roller is brought into press-contact with a capstan with the magnetic tape therebetween) and a brake operation (for braking the rotation of reel turntable engageable with tape reels), other motors are required for transporting the magnetic tape at a constant speed and for driving cassette loading means which reciprocates the tape cassette between an inserting position and a predetermined mounting position.

SUMMARY OF THE INVENTION

An object of this invention is to provide a MTRR apparatus which performs with one motor the cassette loading operation, the tape loading operation, the operating mode changing operation and the magnetic tape transporting operation.

This object is accomplished by a MTRR apparatus which uses a tape cassette having therein tape reels on which a magnetic tape is wound and comprises: a capstan for transporting said magnetic tape at a constant speed in cooperation with a pinch roller; a motor for rotatably driving said capstan; cassette loading means for loading said tape cassette at a predetermined position; tape loading means reciprocating between an inoperative position where said magnetic tape is within said tape cassette and an operative position where said magnetic tape is drawn out of said tape cassette to be loaded in a specific tape path; operating mode changing the means driven by said motor for changing operating mode of said apparatus from one operating mode to another; a pair of reel turntables engageable with said tape reels for rotating said tape reels; reel turntable driving means for transmitting the driving force of said motor to said reel turntables; and clutch means for intermittently transmitting the driving force of said motor to said cassette loading means, said tape loading means and said operating mode changing means, whereby the cassette loading operation, the tape loading operation, the operating mode changing operation and the magnetic tape transporting operation are performed by said motor.

The above and other objects, features and advantages of the present invention will become apparent from the following detailed description taken in conjunction with the accompanying drawings, in which:

BRIEF DESCRIPTION OF THE DRAWINGS

FIG. 3 is a schematic sectional view of a mechanism of a reel turntable driving means.

FIG. 4 is a schematic sectional view of a mechanism including a driving selecting means, a tape loading means, and a controlling torque means.

FIG. 9 is a schematic sectional view of a mechanism including the driving selecting means and the tape loading means.

FIG. 10 is a schematic sectional view of a mechanism of a pinch roller press-contact means.

FIG. 11 is a side view of a mechanism including a motor and a driving member for the pinch roller press-contact means.

FIG. 13 is a side view of a mechanism of a cassette loading means.

FIG. 20 is a block diagram of the apparatus in the recording/reproducing mode.

DESCRIPTION OF THE PREFERRED EMBODIMENT

FIGS. 1, 14, 15, 18 and 20 are block diagrams of an embodiment of the invention, in which lines connecting respective means and components show channels for transmitting the rotational driving force of a motor 501, operation of an actuator 500 or operations of respective means to respective means, thick lines showing the state of the rotational driving force being transmitted and/or the operations, thin lines showing the states of being inactivated, and arrows showing the directions of the respective transmissions.

Figure 1:
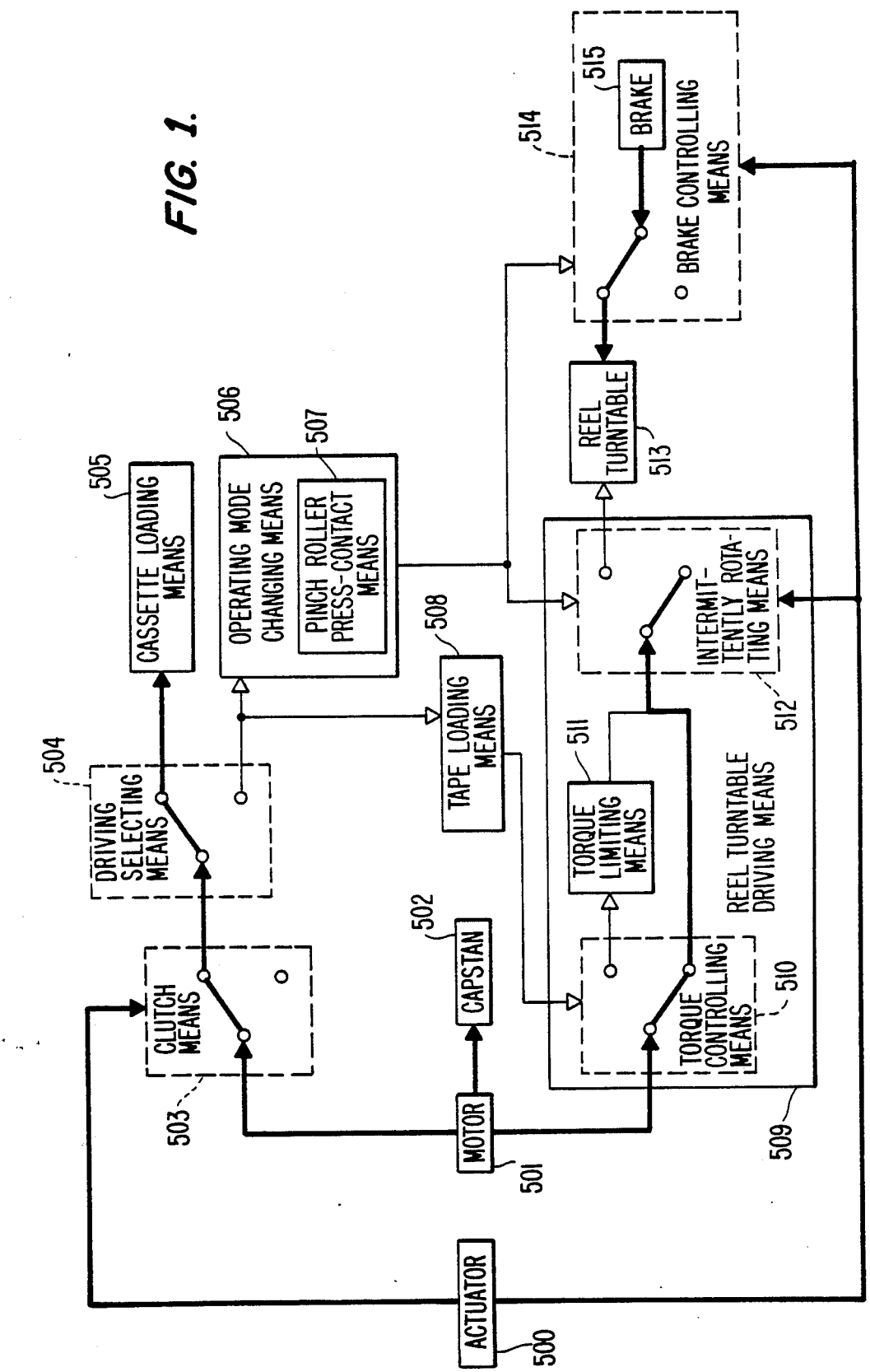
FIG. 1 is a block diagram showing an embodiment of a MTRR apparatus according to this invention.

As explanation will be given of the basic construction of the embodiment of the invention using FIG. 1. The rotational driving force of the motor 501 which drives a capstan 502 is transmitted intermittently to a driving selecting means 504 by a clutch means 503. The driving selecting means 504 selectively drives either a cassette loading means 505, or an operating mode changing means 506 and a tape loading means 508. The operating mode changing means 506 working with the tape loading means 508 comprises a pinch roller press-contact means 507 and controls both an intermittently rotating means 512 and a brake controlling means 514 having a brake 515. A reel turntable driving means 509 transmitting the rotational driving force of the motor 501 to a reel turntable 513 has a torque controlling means 510 controlled by the tape loading means 508, a torque limiting means 511 and the intermittently rotating means 512. The torque controlling means 510 transmits the rotational driving force of the motor 501 to the intermittently rotating means directly or indirectly through the torque limiting means 511 under the control of the tape loading means 508. The reel turntable 513 is intermittently supplied with the rotational driving force of the motor 501 by the intermittently rotating means 512 and is selectively braked by the brake controlling means 514. The actuator 500 drives and/or controls the clutch means 503, the intermittently rotating means 512 and the brake controlling means 514.

Figure 2:
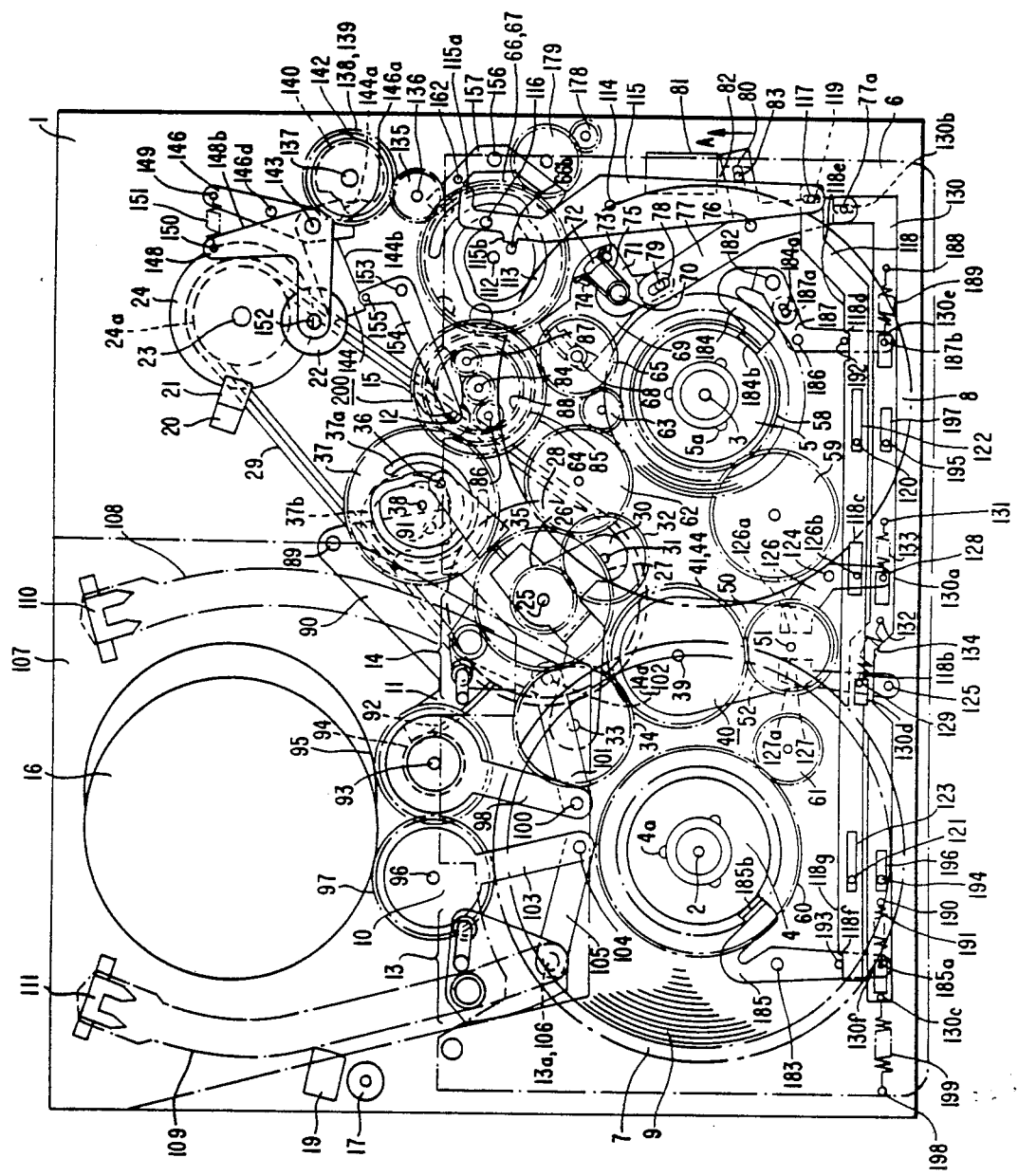
FIG. 2 is a schematic plan view of the embodiment, in which the position of a tape cassette is indicated by dot-dash lines, in a stopping mode, a fast-forward-winding mode, or a recording/reproducing mode.

FIG. 2 is a plan view of the embodiment of the invention, in which a supply reel turntable 4 and a take-up reel turntable 5 are fitted freely-rotatably onto shafts 2 and 3 mounted on a chassis 1 and engage with a supply reel hub 7 and a take-up reel hub 8 respectively within a tape cassette 6 mounted at a predetermined position (shown in dot-dash lines) of the apparatus, thereby rotating integrally with the reel hubs 7 and 8. Within the tape cassette 6 which is provided at its front with three recesses 10, 11 and 12, the magnetic tape 9 drawn out of the supply reel hub 7 passes by the front surface of the tape cassette 6 and reaches the tape-up reel hub 8. Tape guide posts 13, 14 secured on supports 13b and 14b respectively, and a tape guide post 15 for drawing the magnetic tape 9 out of the tape cassette 6 and guiding the magnetic tape 9, are within the respective recesses 10, 11 and 12 and behind the magnetic tape 9.

FIGS. 2, 16, 17 and 19 are plan views of the embodiment of the invention, in which a guide drum 16 having rotary magnetic heads (not shown), a fixed post 17 guiding the magnetic tape 9, a full track erase head 19 erasing all signals recorded on the magnetic tape 9, an audio erase head 20 erasing audio signals recorded on the magnetic tape 9, an audio & control head 21 recording and/or reproducing audio signals and control signals for controlling a tape speed and phase on/from the magnetic tape 9, a capstan 23 transporting the magnetic tape 9 at a constant speed in cooperation with a pinch roller 22, and a motor 24 driving the capstan 23 are disposed on the chassis 1. The motor 24 is a brushless motor with less torque variation and its spindle serves for the capstan 23.

An explanation will be given of the reel turntable driving means. Referring to FIG. 2, a pulley 28 having toothed portions 26 and 27 is fitted rotatably onto a shaft 25 mounted on the chassis 1, and is rotatably driven by the motor 24 through a belt 29 stretched around the pulley 28 and a pulley 24a press-fitted onto the capstan 23. Also a support plate 30 for changing the reduction ratio between the motor 24 and both of the reel turntables 4 and 5 is supported rotatably on the shaft 25 as shown in FIG. 3. A gear 32 used in the recording/reproducing mode is fitted rotatably onto a shaft 31 mounted at one end of the support plate 30 and adapted to always engage with the toothed portion 26 integral with the pulley 28, while a gear 34 used in the fast-forward-winding mode is fitted rotatably onto a shaft 33 mounted at the other end of the support plate 30 and adapted to always engage with the toothed portion 27 integral with the pulley 28. A flexible member 35 having at one end a first cam follower 36 is fixed upon the support plate 30 as shown in FIG. 4. Thus the torque controlling means 510, which controls the driving torque of the both reel turntables 4 and 5, comprises the pulley 28, support plate 30, gear 32 and gear 34.

In FIG. 4, the first rotatable disc 37 which drives the tape loading means 508, is fitted rotatably onto a shaft 38 mounted on the chassis 1, and has at one side a positive cam of grooved cam 37a engageable with the first cam follower 36 for driving the torque controlling means 510, and at the other side a positive cam of grooved cam 37b for driving the tape loading means 508. The grooved cam 37a and 37b extend at an angle of 360° or more as shown in FIG. 5B, and the amount of the cam lift varies between a specific range of degrees of cam rotation. In FIG. 5B, the symbol "a" shows the curve of the cam lift for the grooved cam 37a, and the symbol "b" shows the curve of the cam lift for the grooved cam 37b. The first cam follower 36 is adapted to move only in a range of rotary angle 70° to 120° of the first rotatable disc 37, in which the first rotatable disc 37 rotates clockwise to move the first cam follower 36 rightwardly in FIG. 2, so that the support plate 30 is swung clockwise around the shaft 25. A torque limiting member 40 is supported rotatably on a shaft 39 mounted on the chassis 1 as shown in FIG. 3 and is adapted to keep the driving torque of the motor 24 transmitted to the both reel turntables 4 and 5 constant. The torque limiting member 40 comprises an upside gear 41 of the same diameter as the lower part gear 44, fitted rotatably on the shaft 39, the lower part gear 44 being supported rotatably on a boss 43 provided at the upside gear 41, a friction member 42, such as felt material, adhering to the lower surface of the upside gear 41, a compression spring 46 pressing the friction member 42 against an upside gear surface 45, a spring shoe 47, and a thrust plate 48 and a stopper plate 49. A turnable arm 50 is also supported rotatably on the shaft 39, and a turnable idler gear 52 always engageable with the lower part gear 44 is fitted rotatably onto a shaft 51 mounted at one end of the turnable arm 50. A friction member 53, made of such as a felt material, adheres to the turnable arm 50 and is disposed between the turnable arm 50 and an upper surface 57 of the turnable idler gear 52. A spring shoe 55 and a stopper plate 56 are supported on the shaft 51 and a compression spring 54 is disposed between the rear surface of the turnable idler gear 52 and the spring shoe 55 for pressing the friction member 53 against the upper surface 57 of the turnable idler gear 52 as shown in FIG. 3. When the lower part gear 44 rotates, the turnable arm 50 is turned by the friction between the upper surface 57 of the turnable idler gear 52 and the friction member 53 corresponding to the rotational direction of the lower part gear 44, and allows the turnable idler gear 52 to engage with an idler gear 59 always engageable with a reel gear 58 integral with the take-up reel turntable 5 or an idler gear 61 always engageable with a reel gear 60 integral with the supply reel turntable 4, thereby selectively transmitting the rotation of the motor 24 to the take-up reel turntable 5 or the supply reel turntable 4.

In accordance with the rotation of the first rotatable disc 37 from 0° to 70°, the gear 34 engageable with the toothed portion 27 integral with the pulley 28 engages with the lower part gear 44 so that the driving torque of the motor 24 is directly transmitted to the both reel turntables 4 and 5 but not through the friction member 42 of the torque limiting member 40. As stated above, in accordance with the rotation of the first rotatable disc 37 from 70° to 120°, the support plate 30 turns clockwise around the shaft 25 to disengage the gear 34 from the lower part gear 44, and then allows the gear 32 which engages with the toothed portion 26 integral with the pulley 28 to engage with the upside gear 41, so that after rotation of more than 120°, the gear 32 engages with the upside gear 41. Furthermore the reduction ratio of the gear train consisting of the toothed portion 26, the gear 32 and the upside gear 41 is larger than that of the gear train consisting of the toothed portion 27, the gear 34 and the lower part gear 44. Hence, the torque controlling means 510 is driven and controlled by the first rotatable disc 37 which drives the tape loading means 508 to be discussed below.

The reduction ratio from the upside gear 41 to the reel gear 60 integral with the supply reel turntable 4 is larger than that from the upside gear 41 to the reel gear 58 integral with the take-up reel turntable 5, so as to make the winding torque of the supply reel turntable 4 in the reviewing mode larger than that of the take-up reel turntable 5 in the recording and/or reproducing mode.

Next, an explanation will be given of the actuator 500 and the clutch means 503.

Figure 6A:
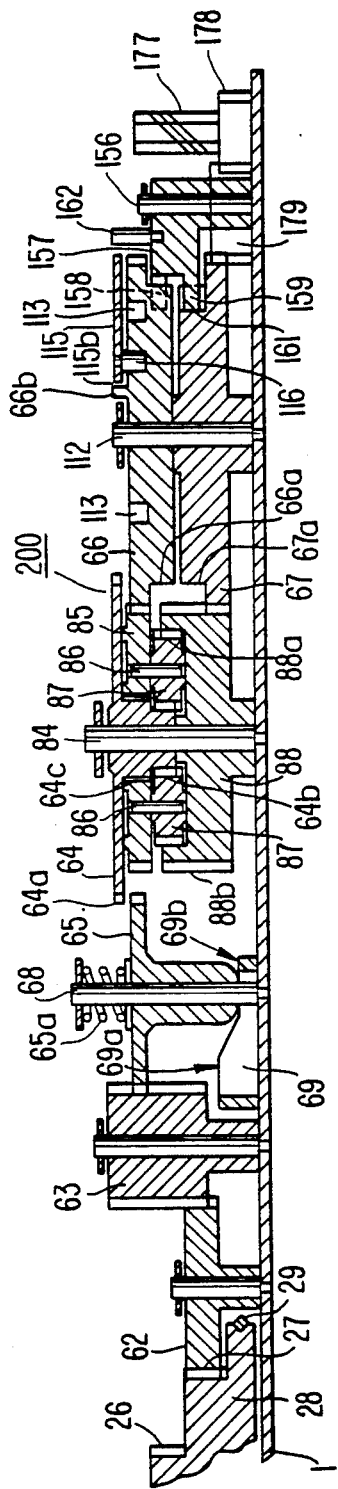
FIGS. 6A and 6B are schematic sectional views of a mechanism including a clutch selecting means, the driving means and an operating mode changing means.
Figure 6B:
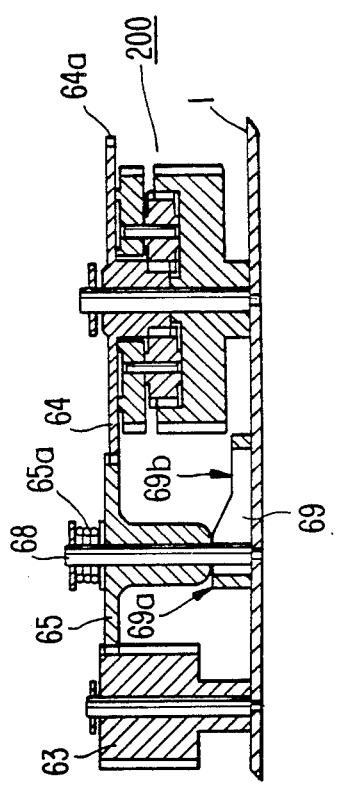
Figure 7:
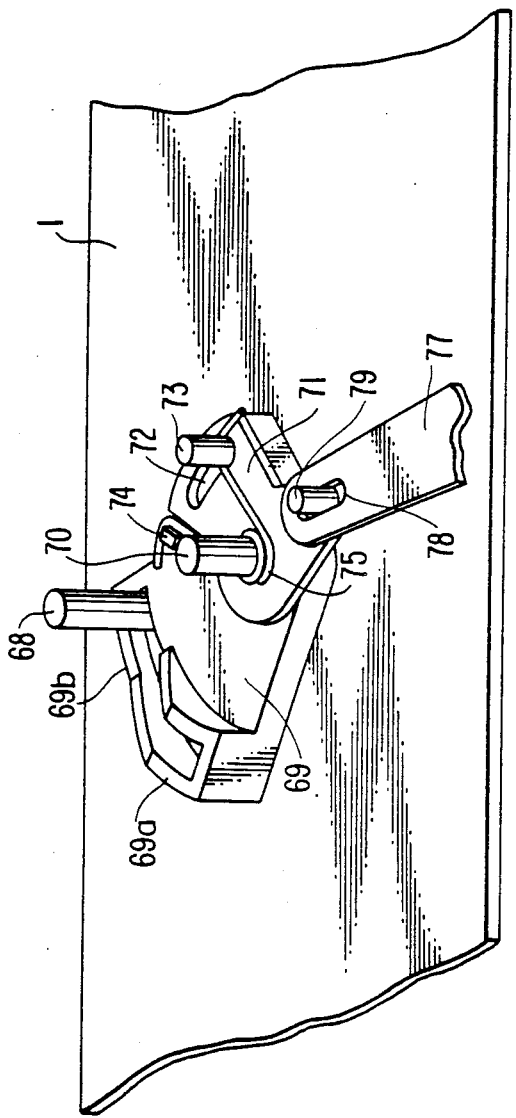
FIG. 7 is a perspective view of a mechanism of the clutch means.
Figure 8:
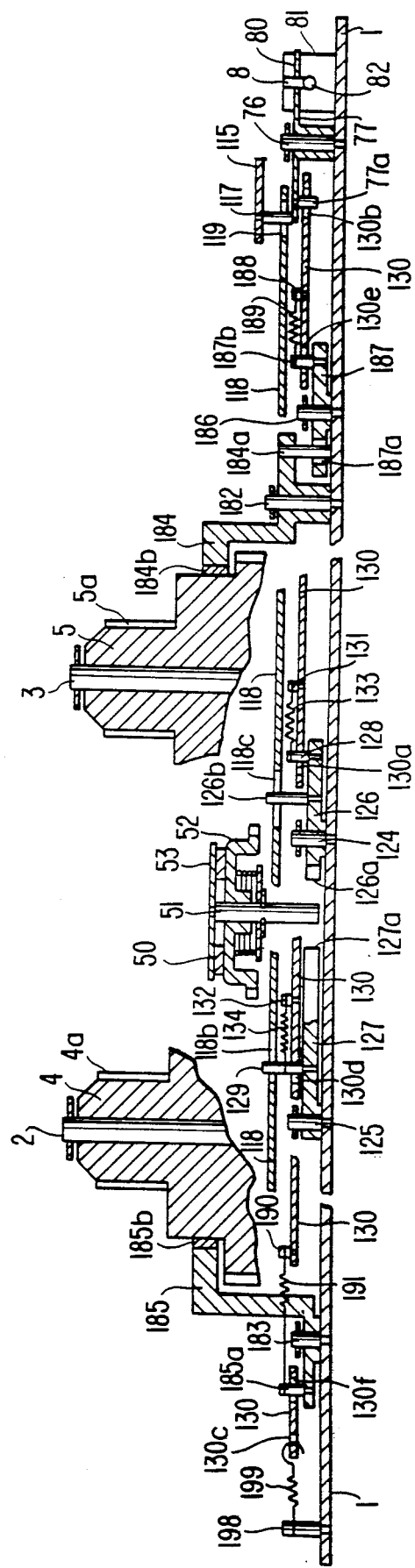
FIG. 8 is a schematic sectional view of a mechanism including the operating mode changing means, a controlling brake means and a intermittently operable rotating means.

The rotational driving force of the motor 24 (501 in FIG. 1) is transmitted to the first rotatable disc 37, the second rotatable disc 66 and the third rotatable disc 67 respectively through a first idler gear 62 engageable with the toothed portion 27 integral with the pulley 28, a second idler gear 63 engageable with the first idler gear 62, and the clutch gear 65 engageable with both the second idler gear 63 and a first toothed portion 64a integral with a driving gear 64. The clutch gear 65 is always engageable with the second idler gear 63 and is supported rotatably on a shaft 68 mounted on the chassis 1, is allowed to move upwardly and downwardly along the shaft 68, is always biased downwardly by a compression spring 65a, and is disposed on a first clutch plate 69 fitted rotatably onto a shaft 70 mounted on the chassis 1 as shown in FIGS. 6A and 6B. The first clutch plate 69 has an upper face 69a and a lower face 69b which are different in height as shown in FIGS. 6A, 6B and 7. A slot 72 provided in a second clutch plate 71 which is fitted rotatably onto the shaft 70 and disposed on the first clutch plate 69, engages with a projection 73 provided on the first clutch plate 69, and a torsion spring 75 is disposed between the projection 73 and a projection 74 provided on the second clutch plate 71 as shown in FIG. 7, so that the second clutch plate 71 is always biased counterclockwise, as shown in FIG. 2, to cause the first clutch plate 69 and the second clutch plate 71 to turn integrally with each other around the shaft 70. A slot 78 provided at one end of a turnable lever 77 supported turnably on a shaft 76 mounted on the chassis 1 engages with a pin 79 provided at one end of the second clutch plate 71, and a slot 80 provided at the other end of the turnable lever 77 engages with a connecting pin 83 provided on a plunger 82 being supported freely-slidably on a solenoid 81 disposed on the chassis 1 as shown in FIGS. 2 and 8. When the solenoid 81 is energized, the plunger 82 is retracted in the direction of the arrow A in FIG. 2 and the turnable lever 77 is turned counter-clockwise around the shaft 76, instantaneously the second clutch plate 71 and the first clutch plate 69 are turned clockwise integrally with each other around the shaft 70 through the torsion spring 75. Hence, the clutch gear 65 runs onto the upper face 69a from the lower face 69b of the first clutch plate 69 and is changed from the condition as shown in FIG. 6A to that as shown in FIG. 6B, so that the clutch gear 65 engages with the first toothed portion 64a integral with the driving gear 64. As stated above, the clutch means 503 is driven and controlled by the actuator 500 comprising the plunger 82 and the solenoid 81.

In the embodiment of the present invention, the actuator 500 comprises the plunger 82 and the solenoid 81, but it may comprise a motor for obtaining the same effect in this invention.

When the clutch gear 65 does not engage with the first toothed portion 64a due to the abutting of the surfaces of teeth of the clutch gear 65 against that of the first toothed portion 64a regardless of the clutch gear 65 being moved upwardly in FIG. 6 along the shaft 68 by the first clutch plate 69, the first clutch plate 69 stops turning while the second clutch plate 71 turns clockwise around the shaft 70 against the biasing force of the torsion spring 75. And when the clutch gear 65 engages with the first toothed portion 64a, the first clutch plate 6 starts to turn clockwise again around the shaft 70, and the clutch gear 65 runs completely onto the upper face 69a of the first clutch plate 69. Thus even when the surface of the teeth of the clutch gear 65 abut against that of the first toothed portion 64a, the plunger 82 and the turnable lever 77 do not stop turning and the clutch gear 65 is not subjected to an axial excessive force by the plunger 82.

The driving selecting means 504 which drives selectively either the cassette loading means 505 or the operating mode changing means 506 comprises a differential gear mechanism 200 as shown in FIG. 6. An explanation will be given on the differential gear mechanism 200.

The driving gear 64 having the first toothed portion 64a selectively engageable with the clutch gear 65 and a sun gear 64b are fitted freely rotatably onto a shaft 84 mounted on the chassis 1. A plurality of shafts 86 are provided on a retainer gear 85 which is fitted rotatably onto a boss 64c provided on the driving gear 64, and support rotatably the planetary gears 87 on the shafts 86, the planetary gears 87 engaging with the sun gear 64b. And a transmission gear 88 having at the inner periphery an internal toothed portion 88a and at the outer periphery an external toothed portion 88b is fitted rotatably onto the shaft 84, the internal toothed portion 88a engaging with the planetary gears 87. Hence, when the transmission gear 88 is restrained from rotating, the planetary gears 87 are revolved on their axes round the shaft 84 by the rotation of the driving gear 64, the retainer gear 85 being decelerated and rotating around the shaft 84 in the same direction as that of the driving gear 64. When the retainer gear 85 is restrained from rotating, the planetary gears 87 are revolved on their axes by the rotation of the driving gear 64, the transmission gear 88 being decelerated and rotating around the shaft 84 in the reverse direction to that of the driving gear 64.

The following explanation will be given of the tape loading means 508. The first rotatable disc 37 for driving the tape loading means 508 engages with the retainer gear 85. A second cam follower 91 fixed at one end of an arm 90 supported rotatably on a shaft 89 mounted on the chassis 1 engages with the grooved cam 37b at the rear surface of the first rotatable disc 37 as shown in FIGS. 2 and 9. A sector gear 92 formed on the other end of the arm 90 engages with a first loading gear 94 fitted rotatably onto a shaft 93 mounted on the chassis 1. A second loading gear 95 integral with the first loading gear 94 and rotatable around the shaft 93 engages with a third loading gear 97 fitted onto a shaft 96 mounted on the chassis 1. Thus the loading gear train comprising 94, 95 and 97 rotates in synchronism with the sector gear 92. In FIG. 9, a first arm 98 for rightward loading is fitted rotatably onto the shaft 93. A tension spring 99a is stretched between a spring seat 98a provided at the first arm 98 for rightward loading and a pin 95a mounted on the second loading gear 95, so that the pin 95a abuts against a stopper 98b provided on the first arm 98 to allow the first arm 98 and the second loading gear 95 to rotate integrally with each other. A second arm 101 for rightward loading is connected rotatably at one end to the end of the first arm 98 through a pin 100 and has a bore 102 at the other end, the bore 102 being engageable with a pin 14a mounted on the support 14b. Reference numeral 103 designates a first arm for leftward loading, which has the same construction with respect to the third loading gear 97 as between the first arm 98 for rightward loading and the second loading gear 95, thus being integral with the third loading gear 97 through a tension spring 99b (not shown). The arm 103 also connects at one end rotatably with a second arm 105 for leftward loading though a pin 104, and has a bore 106 at the other end of the second arm 105, the bore 106 being engageable with a pin 13a mounted on the support 13b.

When the first rotatable disc 37 starts to rotate clockwise from the position in FIG. 2, the second cam follower 91 is not moved during the clockwise rotation of the first rotatable disc 37 from 0° to 150° as shown in the curve "b" in FIG. 5B, but after more than 150°, the sector gear 92 begins to rotate clockwise around the shaft 89 because the second cam follower 91 is moved leftwardly in FIG. 2. Hence, the first loading gear 94 engageable with the sector gear 92, the second loading gear 95 and the first arm 98 for rightward loading rotate counter-clockwise, and the third loading gear 97 and the first arm 103 for leftward loading rotate clockwise, resulting in that the supports 14b and 13b start movement along guide grooves 108 and 109 provided in the sub-chassis 107 which is spaced from the chassis 1 by a predetermined interval and disposed on the chassis 1. When the first rotatable disc 37 rotates to an angle of 280°, the first arm 98 for rightward loading and the first arm 103 for leftward loading move the supports 14b and 13b to the positions where the tape guide posts 14 and 13 thereof abut against the positioning members 110 and 111 respectively fixed on the sub-chassis 107. Upon more than 280° of the first rotatable disc 37 rotation, because the tape guide posts 14 and 13 abut against the positioning members 110 and 111 respectively, the first arm 98 for rightward loading and the first arm 103 for leftward loading cannot turn further. As a result, the second loading gear 95 and the third loading gear 97 continue to rotate counter-clockwise and clockwise against the tension springs 99a and 99b respectively. When the first rotatable disc 37 rotates beyond an angle of 300°, the sector gear 92, the second loading gear 95, and the third loading gear 97 do not rotate because the second cam follower 91 is not moved as shown in the curve "b" in FIG. 5B.

Next an explanation will be given of the operating mode changing means 506 which drives the pinch roller press-contact means 507, the brake controlling means 514 and the intermittently rotating means 512.

Figure 5A:
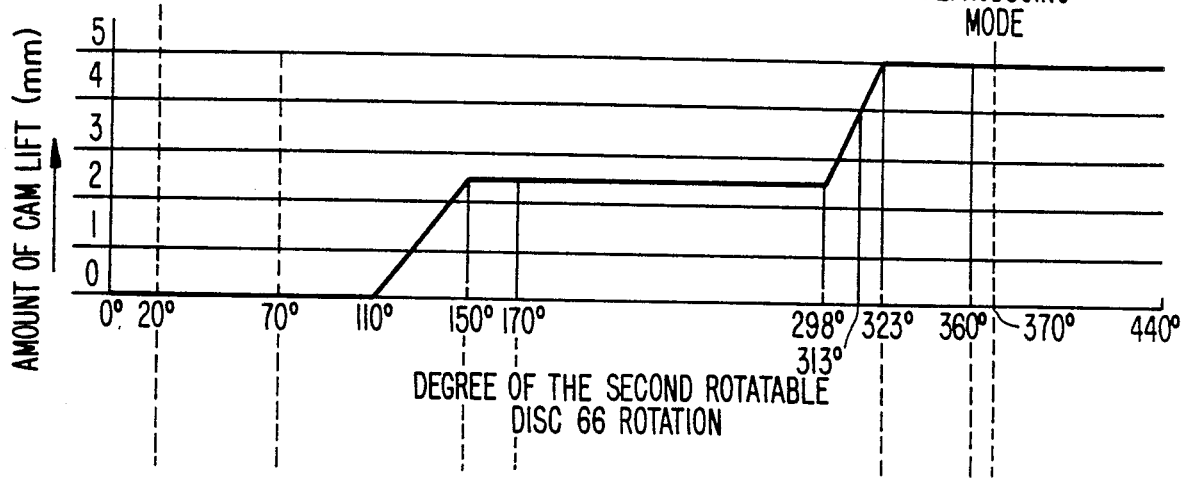
FIGS. 5A, 5B and 5C are diagrams showing relationships between the amount of cam lift and degree of cam rotation.
Figure 5B:
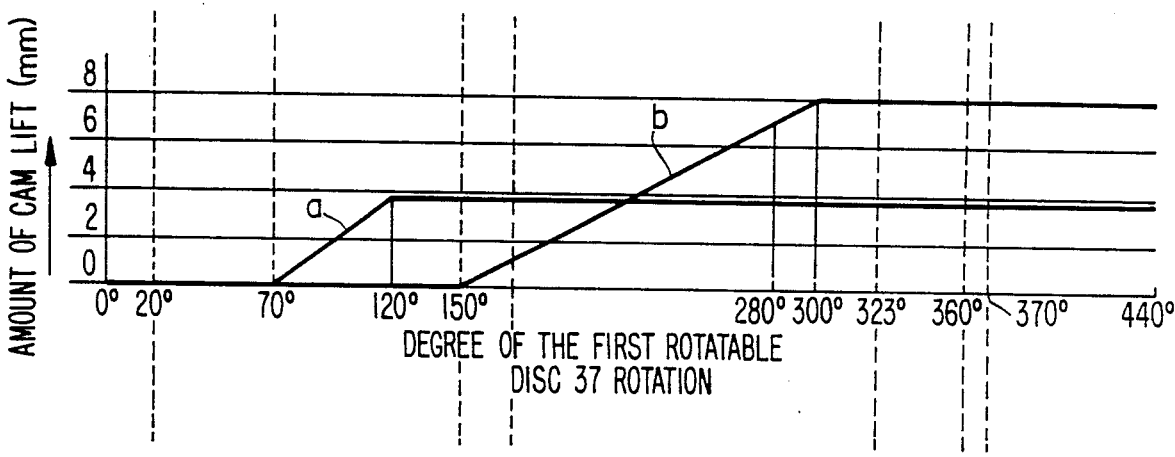

In FIG. 6, the second rotatable disc 6b engageable with the retainer gear 85 is fitted freely-rotatably onto a shaft 112 mounted on the chassis 1 and has at one side a positive cam groove 113 extending through an angle of 360° or more as shown in FIG. 5A for changing the operation mode of the apparatus. A cam follower 116 fixed at one end of a turnable arm 115 which is supported rotatably onto a shaft 114 mounted on the chassis 1 as shown FIG. 2, engages with the cam grooved 113. The cam groove 113 is adapted to move the cam follower 116 only in a range where the lifting amount changes as shown in FIG. 5A. The second rotatable disc 66 has the same diameter and the same number of teeth as the first rotatable disc 37. A pin 117 fixed at the other end of the turnable arm 115 engages with a slot 119 provided at one end of a main rod 118 which moves to a plurality of positions in synchronism with the movement of the cam follower 116. Guide slots 122 and 123 which are cut in the main rod 118 are fitted onto the guide shafts 120 and 121 respectively mounted on the chassis 1, and the main rod 118 is mounted movably for reciprocation along the guide slots 122 and 123. Hence, when the turnable arm 115 is turned around the shaft 114 by the cam follower, the main rod 118 is driven in the left or right direction in FIG. 2 under the guidance of guide shafts 120 and 121 and guide slots 122 and 123. Thus the operating mode changing means 506 comprises the cam groove 113 and the main rod 118.

A pin 77a fixed at another end of the turnable lever 77 engages with a slot 130b provided at one end of a sub-rod 130. Guide slots 196 and 197 which are cut in the sub-rod 130 are fitted onto the guide shafts 194 and 195 respectively mounted on the chassis 1, and the sub-rod 130 is mounted movably for reciprocation along the guide slots 196 and 197. A tension spring 199 is stretched between a bore 130c provided at the other end of the sub-rod 130 and a shaft 198 mounted on the chassis 1, so that the sub-rod 130 is always biased leftwardly in FIG. 2 by the tension spring 199. Hence, when the plunger 82 is retracted in the direction of the arrow A in FIG. 2 by the solenoid 81 being energized, the turnable lever 77 is turned counter-clockwise around the shaft 76 and the sub-rod 130 is moved rightwardly in FIG. 2. When the solenoid 81 is de-energized, the sub-rod 130 is moved leftwardly in FIG. 2 by the tension force of the tension spring 199 and the turnable lever 77 is turned clockwise around the shaft 76, the plunger 82 being moved in the reverse direction to the arrow A in FIG. 2. Thus the operation of the plunger 82 is transmitted to the intermittently rotating means 512 and the controlling brake means 514 to be discussed below by the turnable lever 77 and the sub-rod 130.

Next an explanation will be given of the brake controlling means 514.

A brake 184 at the take-up reel side and that 185 at the supply reel side are fitted rotatably onto the shafts 182 and 183 respectively as shown in FIGS. 2 and 8. A pin 184a fixed at one end of the brake 184 engages with a slot 187a provided at one end of a brake lever 187 which is fitted rotatably onto a shaft 186 mounted on the chassis 1, whereby the brake 184 at the take-up reel side is adapted to be actuated by the brake lever 187. A tension spring 189 is stretched between a pin 187b fixed at the other end of the brake lever 187 and a pin 188 fixed on the sub-rod 130, whereby the brake lever 187 is biased counter-clockwise by the tension spring 189 so that the brake 184 is biased clockwise as shown in FIG. 2. A tension spring 191 is stretched between a pin 185a fixed at one end of the brake 185 at the supply reel side and a pin 190 fixed on the sub-rod 130, whereby the brake 185 is biased counter-clockwise by the tension spring 191. The brakes 184 and 185, having brake shoes 184b and 185b which abut against the reel turntables 5 and 4 respectively, are made of flexible material thereby being adapted to adjust the braking effect when the brake shoes 184b and 185b tend to bite the reel turntables 5 and 4 respectively. Reference numerals 192 and 193 designate kick pins mounted on the brake lever 187 and the supply reel side brake 185 respectively. The brakes 184 and 185 are moved away from the both reel turntables 5 and 4 to release the braking effect, the kick pins 192 and 193 being pushed leftwardly in FIG. 2 by the main rod 118, or the pins 187b and 185a being pushed leftwardly by the sub-rod 130.

The intermittently rotating means 512 which transmits the rotational driving force of the motor 24 intermittently to both reel turntables 4 and 5 selectively, comprises a righthand stopper arm 126 and a lefthand stopper arm 127 fitted rotatably onto shafts 124 and 125 respectively mounted on the chassis 1. A tension spring 133 is stretched between a pin 128 mounted on the righthand stopper arm 126 and a pin 131 mounted on the sub-rod 130, the pin 128 abutting against a notch edge surface 130a provided on the sub-rod 130 to restrain the stopper arm 126 from turning counter-clockwise around the shaft 124. A tension spring 134 is stretched likewise between a pin 129 mounted on the lefthand stopper arm 127 and a pin 132 mounted on the sub-rod 130, the pin 129 abutting against a notch edge surface 118a provided on the main rod 118 and/or a notch edge surface 130d provided on the sub-rod 130 to restrain the stopper arm 127 from turning clockwise around the shaft 125.

Figure 16:
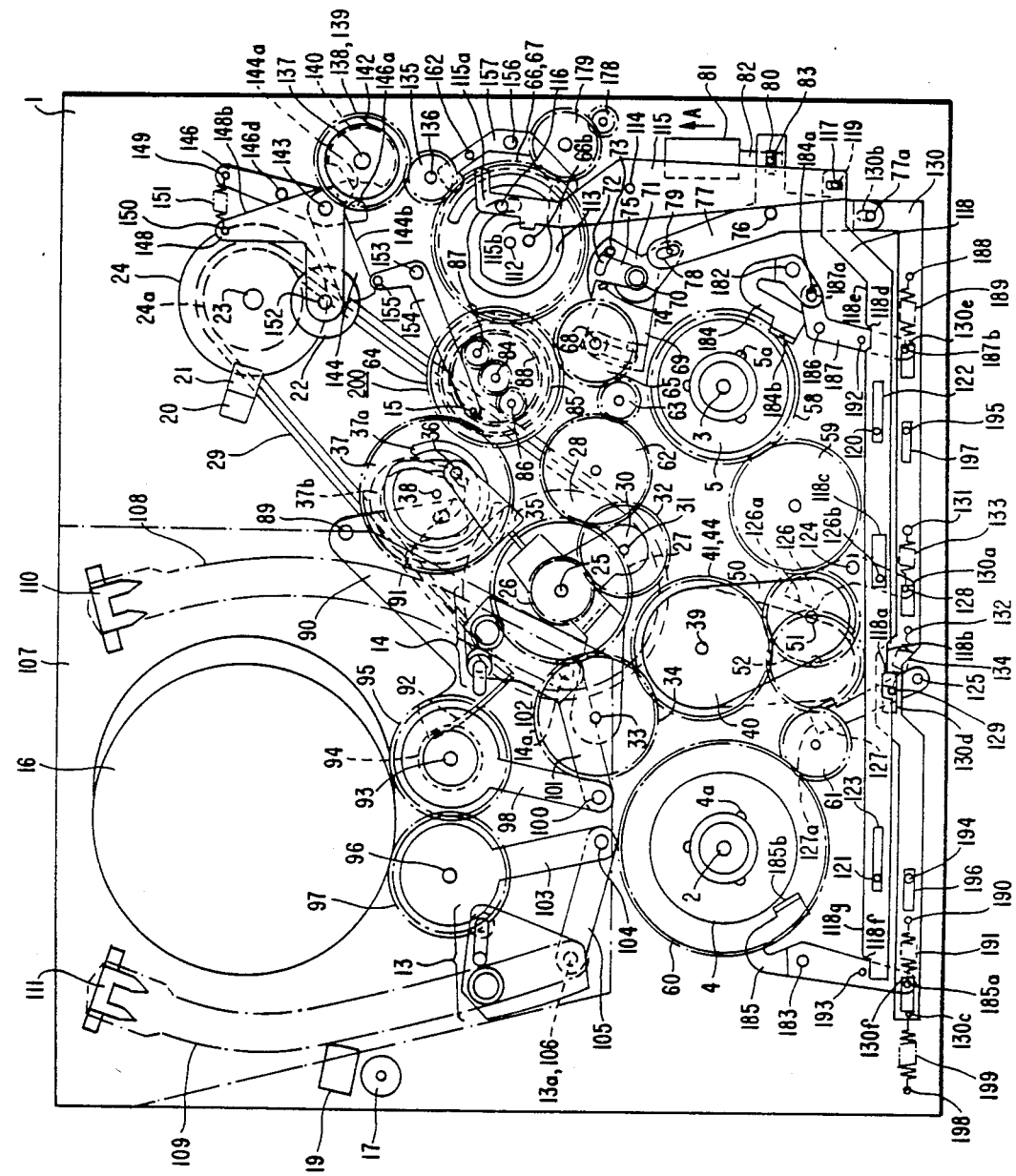
FIG. 16 is a schematic plan view of the apparatus in the fast-forward-winding mode.

When the conditions are changed from energizing the solenoid 81 as shown in FIG. 2 to de-energizing the solenoid 81 as shown in FIG. 16 at a rotary angle of 20° of the second rotatable disc 66 which drives the operating mode changing means 506, the sub-rod 130 is moved leftwardly in FIG. 2 by the tension force of the tension spring 199, and the pins 187b and 185a are pushed leftwardly in FIG. 2 by the notch edge surfaces 130e and 130f respectively which are cut in the sub-rod 130, so that the brakes 184 and 185 are moved away from the both reel turntables 5 and 4 to release the braking effect. At this time, the pins 128 and 129 are pushed leftwardly by the notch edge surfaces 130a and 130d respectively, and the both stopper arms 126 and 127 are turned clockwise and counter-clockwise around the shafts 124 and 125 respectively, so that the turnable idler gear 52 is able to engage rotatably either with the idler gear 59 or 61. When the conditions are changed from de-energizing the solenoid 81 as shown in FIG. 16 to energizing, the plunger 82 is retracted in the direction of the arrow A in FIG. 2 instantaneously and the action of the plunger 82 instantaneously returns the sub-rod 130 to the condition of FIG. 2. Simultaneously the pins 187b and 185a disengage from the notch edge surfaces 130e and 130f respectively, thereby instantaneously applying the braking effect to the both reel turntables 5 and 4 by the tension springs 189 and 191 respectively. At this time, the turnable idler gear 52 is disengaged either from the idler gear 59 or 61 by the two stopper arms 126 and 127. Hence, the action of the plunger 82 by operating the solenoid 81 drives and controls both the intermittently rotating means 512 and the controlling brake means 514.

When the solenoid 81 is energized and the two stopper arms 126 and 127 are positioned as shown in FIG. 2, the turnable idler gear 52 does not engage rotatably either with the idler gear 59 or 61 regardless of the turnable arm 50 being driven by the motor 24 which transmits its rotation to the turnable arm 50, and the turnable arm 50 turning clockwise or counter-clockwise around the shaft 39, since the shaft 51 mounted on the turnable arm 50 abuts against the edge surface 126a of the righthand stopper arm 126 or the edge of 127a of the lefthand stopper arm 127a. Hence, the two reel turntables 5 and 4 do not rotate. When the second rotatable disc 66 rotates clockwise to an angle of 110° as shown in FIG. 4A when the solenoid 81 is energized, the cam follower 116 is not moved and the main rod 118 is not moved either, whereby the both stopper arms 126 and 127 restrain the turnable arm 50 from turning as stated above. When the second rotatable disc 66 rotates clockwise more than an angle of 110° as shown in FIG. 4A in the condition of the solenoid 81 energized, the cam follower 116 is started to move rightwardly in FIG. 2, and the turnable arm 115 is also started to turn clockwise around the shaft 114, whereby the main rod 118 which engages with the turnable arm 115 is started to move straight leftwardly in FIG. 2. At this time, the kick pins 192 and 193 are pushed leftwardly by the notch edge surfaces 118d and 118f respectively, thereby turning clockwise around the shafts 186 and 183 against the biasing force of the tension springs 189 and 191. Hence, the brake lever 187 turns clockwise around the shafts 186, and the brake 184 at the take-up reel side which engages with the brake lever 187 turns counter-clockwise around the shaft 182, the brake 185 at the supply reel side turning clockwise around the shaft 183. Furthermore, the kick pins 192 and 193 continue to turn clockwise until the kick pins 192 and 193 run into the edge surfaces 118e and 118g respectively which moves the brakes 184 and 185 away from the reel turntables 5 and 4 and where the brake effect is released. After the kick pins 192 and 193 have run onto the edge surfaces 118e and 118g, the pins 187b and 185f move away from the notch edge surfaces 130e and 130f of the sub-rod 130 respectively, and the pins 187b and 185a do not abut against the sub-rod 130 regardless of the rightward or leftward movement of the sub-rod 130, so that the pins 187b and 185a disengage from the sub-rod 130. Thus the movement of the plunger 82 is transmitted to neither the brakes 184 and 185 nor the intermittently rotating means 512. This condition is kept until a rotary angle of the second rotatable disc 66 becomes 440°. When the second rotatable disc 66 rotates clockwise to an angle of 150°, the pin 129 which abuts against the notch edge surface 118a of the main rod 118 is pushed leftwardly in FIG. 2 by the notch edge surface 118a, thereby turning counter-clockwise around the shaft 125 against the biasing force of the tension spring 134. Furthermore, the pin 129 continues to turn counter-clockwise until the pin 129 runs onto the notch edge surface 118b where the turnable idler gear 52 is engageable with the idler gear 61. After the pin 129 which has run into the notch edge surface 118b, the pin 129 moves slidably onto the notch edge surface 118b, and the lefthand stopper arm 127 does not further turn in spite of the leftward movement of the main rod 118, so that the biasing force of the tension spring 134 does not increase with the movement of the main rod 118. If the turnable arm 50 turns clockwise at that time, the turnable idler gear 52 engages with the idler gear 61 as stated above, and the take-up reel turntable 5 is also capable, of rotating. This condition is kept until the rotary angle of the second rotatable disc 66 becomes 298°. When the second rotatable disc 66 rotates from an angle of 298° to 323°, the cam follower 116 is further moved rightwardly in FIG. 2, and the turnable arm 115 is also turned clockwise around the shaft 114, whereby the main rod 118 is moved straight leftwardly. When the second rotatable disc 66 rotates to an angle of 313°, the pin 126b mounted on the righthand stopper arm 126 abuts against the notch edge surface 118c provided on the main rod 118 thereby being pushed by the notch edge surface 118c with the leftward movement of the main rod 118. Hence the pin 126b turns clockwise around the shaft 124 against the biasing force of the tension spring 133 and continues to turn until the turnable idler gear 52 is engageable with the idler gear 59. In other words the rotatable disc 66 rotates to an angle of 323°. When the second rotatable disc 66 rotates more than an angle of 323°, the turnable idler gear 52 is engageable with the idler gear 59. If the turnable arm 50 turns counter-clockwise at that time, the turnable idler gear 52 engages with the idler gear 59, and the take-up reel turntable 5 is capable of rotating and winding the magnetic tape 9 onto the take-up reel hub 8. Thus the operating mode changing means 506 which comprises the grooved cam 113 and the main rod 118, drives and controls both the intermittently rotating means 512 and the brakes 184 and 185.

Next an explanation will be given of the pinch roller press-contact means 507 in FIGS. 10 and 11.

Figure 5C:
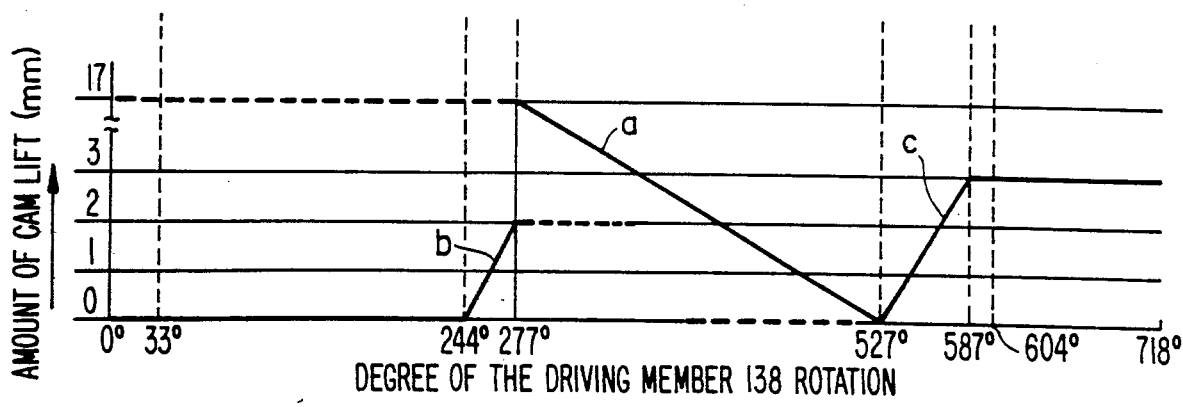

A gear 135 in engagement with the second rotatable disc 66 driving the operating mode changing means 506 is fitted rotatably onto a shaft 136 mounted on the chassis 1 and engages with a toothed portion 139 integral with a driving member 138 which is fitted rotatably onto a shaft 137 mounted on the chassis 1. The driving member 138 is provided with a first peripheral cam 140, a cylindrical cam 141 and a second peripheral cam 142. The first peripheral cam 140 abuts against a first edge surface 144a of a relay lever 144 which is fitted rotatably onto a shaft 143 mounted on the chassis 1, so that the first peripheral cam 140 pushes the first edge surface 144a. The cylindrical cam 141 abuts against a projection 145a of a guide member 145 which is fitted onto the shaft 137, guided by the shaft 137 and capable of moving perpendicularly to the chassis 1, thereby moving the guide member 145 up and down. The second peripheral cam 142 abuts against a projection 146a of a pressure lever 146 which presses the pinch roller 22 to be in contact with the capstan 23 after the pinch roller 22 has moved to a predetermined position, so that the second peripheral cam 142 pushes the projection 146a. The outer periphery 148a of a pinch roller arm 148 which is fitted rotatably onto the shaft 143 is fitted both into the interior 146b of the pressure lever 146 and into a bore 145b provided at one end of the guide member 145, and the pinch roller arm 148 is supported by an upper surface 146c of the pressure lever 146, the pressure lever 146 being supported by the upper surface 145c of the guide member 145. Hence the pressure lever 146 and the pinch roller arm 148 move integrally with the guide member 145 upwardly or downwardly in FIGS. 10 and 11 guided by the shaft 143, when the guide member 145 moves upwardly or downwardly guided by the shaft 137. A tension spring 151, as shown in FIG. 2, is stretched between a hook 149 provided on the pressure lever 146 and a hook 150 provided on the pinch roller arm 148, so that the edge surface 148 of the pitch roller arm 148 abuts against a stopper 146d provided on the pressure lever 146 to cause the pressure lever 146 and the pinch roller arm 148 to rotate integrally with each other. The projection 146a on the pressure lever 146 is always pushed by a biasing spring (not shown) at the outer periphery of the driving member 138, and to the second peripheral cam 142 after the guide member 145 has moved down to the lowest position, the pressure lever 146 turning around the shaft 143 by the action of the second peripheral cam 142. The pinch roller 22 is fitted freely-rotatably onto a shaft 152 mounted at one end of the pinch roller arm 148 rotating integrally with the pressure lever 146. On the other hand, the tape guide post 15 for drawing the magnetic tape 9 out of the tape cassette 6 is fixed at one end of a guide post arm 154 fitted rotatably onto a shaft 153 mounted on the chassis 1, a pin 155 being fixed at the other end of the guide post arm 154 so as to abut against a second edge surface 144b of the relay lever 144. The pin 155 is pushed by the second edge surface 144b of the relay lever 144, so that the guide post arm 154 turns around the shaft 153. The cylindrical cam 141, the first peripheral cam 140 and the second peripheral cam 142, as shown in FIG. 5C, are adapted to vary the amounts of cam lift between a specific range of degrees of cam rotation and symbols "a", "b" and "c" show the curves of cam lift for the cylindrical cam 141, the first peripheral cam 140 and the second peripheral cam 142 respectively. The horizontal axis in FIG. 5C shows the rotary angle of the driving member 138 and the broken lines in FIGS. 5A, 5B and 5C show correspondence to a rotary angle of the second rotatable disc 66 which drives the driving member 138 increasingly in speed. For instance, when the second rotatable disc 66 rotates to an angle of 150°, the second rotatable disc 66 drives the driving member 138 rotatably to an angle of 244°.

Figure 17:
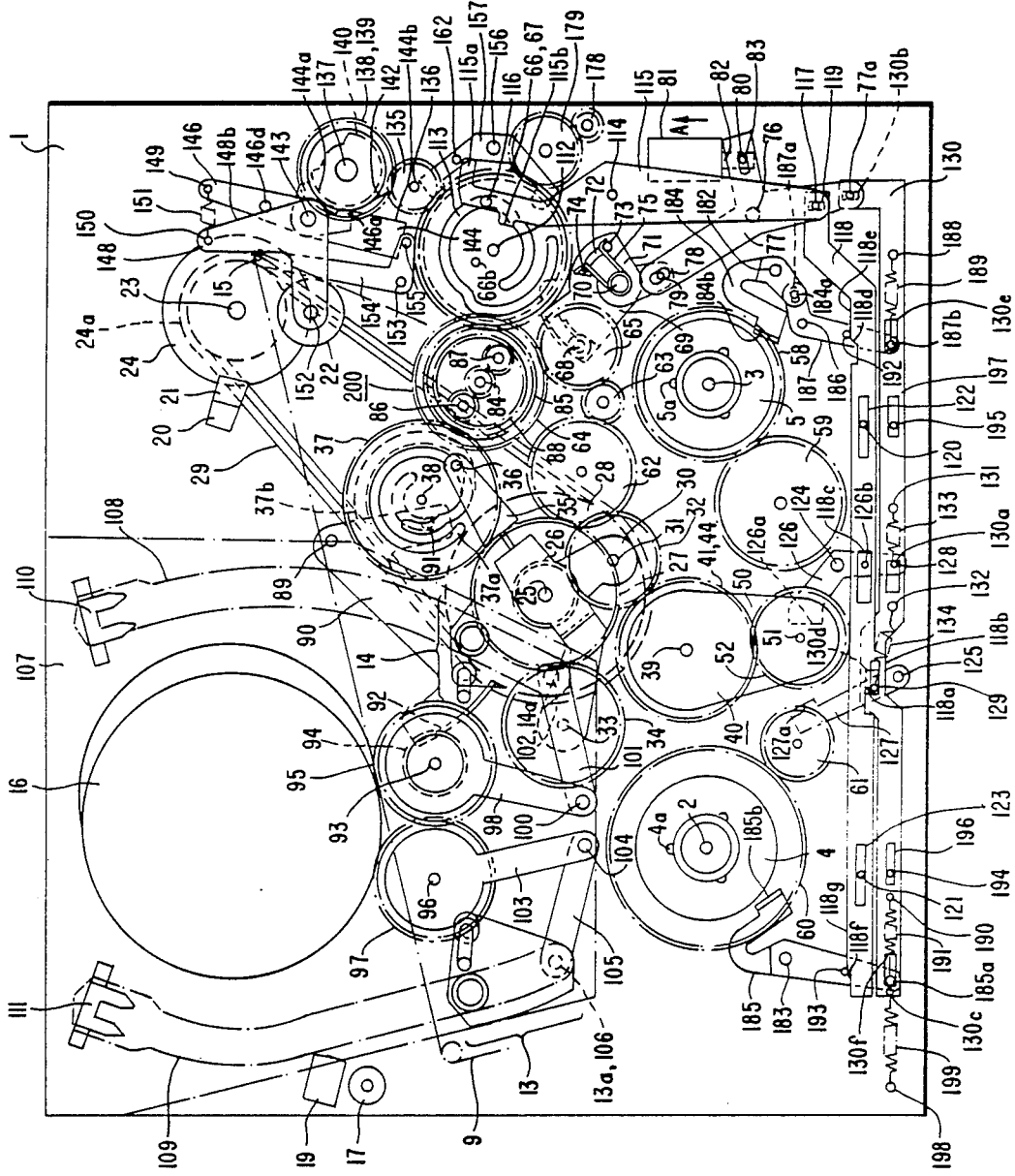
FIG. 17 is a schematic plan view of the apparatus in the state where a first rotatable disc and a second rotatable disc rotate to a rotary angle of 170°.

The clockwise rotation of the second rotatable disc 66 is transmitted to the driving member 138 through the gear 135, so that the driving member 138 rotates clockwise. When the driving member 138 rotates to an angle of 277°, the first edge surface 144a of the relay lever 144 is pushed by the first peripheral cam 140 and the relay lever 144 rotates counter-clockwise around the shaft 143, at which time the second edge surface 144b of the relay lever 144 pushes the pin 155 and the guide post arm 154 rotates clockwise around the shaft 153. The tape guide post 15 fixed on the guide post arm 154 draws out the magnetic tape 9 to a predetermined position as shown in FIG. 17, so that the magnetic tape 9 forms a tape path as shown in dot-dash lines in FIG. 17, and the tape guide post 15 is locked by locking means (not shown). When the driving member 138 continues its rotation to an angle of 527° as shown in FIG. 5C, the guide member 145 abutting against the cylindrical cam 141, the pressure lever 146 and the pinch roller arm 148 move down integrally with each other perpendicularly to the tape path of the magnetic tape 9 along the shaft 143 guided by the cylindrical cam 141, and the pinch roller 22 also moves down perpendicularly to the tape path of the magnetic tape 9 as shown in FIG. 11 from the position where the tape guide post 15 is not hindered from drawing out the magnetic tape 9 as shown in FIG. 10, so as to be positioned inside of the loop of the tape path formed by the tape guide post 15 drawing out the magnetic tape 9 as shown in dot-dash lines in FIG. 17.

Furthermore when the driving member 138 continues its rotation and the projection 146a of the pressure lever 146 is pushed by the second peripheral cam 142, the pressure lever 146 and the pinch roller arm 148 turn clockwise integrally around the shaft 143, so that the pinch roller 22 abuts against the capstan 23 by the time when the rotary angle of the driving member 138 becomes 587°, whereby the pinch roller arm 148 is restrained from turning. After that, only the pressure lever 146 turns continuously and the hook 149 of the pressure lever 146 moves away from the hook 150 of the pinch roller arm 148 against the biasing force of the tension spring 151. When the driving member rotates to an angle of 587°, the pinch roller 22 is brought into press-contact with the capstan 23 at the predetermined strength. Even when the driving member 138 turns further over an angle of 587°, the amount of cam lift of the second peripheral cam 142 remains unchanged as shown in the curve "c" in FIG. 5C and the pinch roller 22 remains in press-contact with the capstan 23. Hence the magnetic tape 9 is transported at a constant speed by cooperation of the pinch roller 22 with the capstan 23 which is driven rotatably directly by the brushless motor 24 rotating.

Next an explanation will be given of the driving selecting means 504.

Figure 12A:
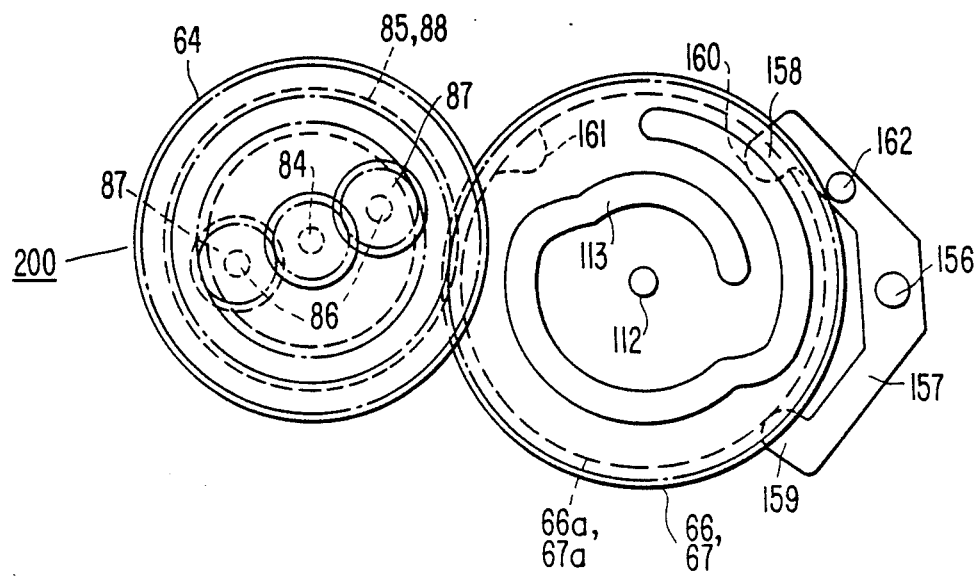
FIGS. 12A and 12B are schematic top views of a mechanism of the driving selecting means.
Figure 12B:
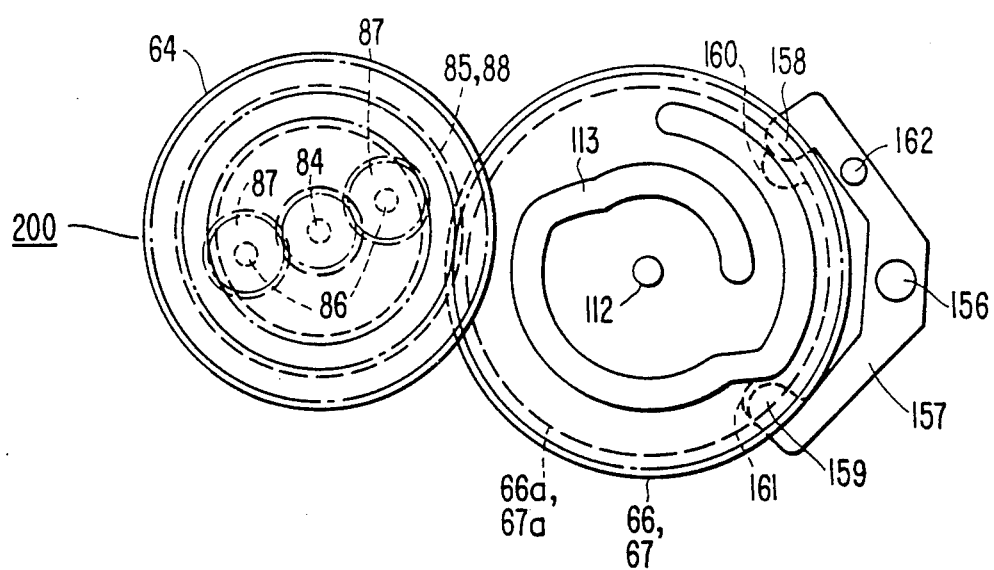

In FIGS. 12A, 12B and 6A, the second rotatable disc 66 which drives the operating mode changing means 506 and the tape loading means 508, and the third rotatable disc 67 which drives the cassette loading means 505 are both fitted rotatably onto the shaft 112 and in engagement with the retainer gear 85 and the transmission gear 88 respectively. On the outer peripheries of cylinders 66a and 67a of the second and third rotatable discs 66 and 67, notched grooves 160 and 161 are provided respectively, into which projection stoppers 158 and 159 are fit, the stoppers being provided at both ends of a detent arm 157 fitted rotatably onto a shaft 156 mounted on the chassis 1. When the projection stopper 158 of the detent arm 157 enters into the notched groove 160 of the second rotatable disc 66, the projection stopper 159 abuts against the outer periphery of cylinder 67a of the third rotatable disc 67. When the projection stopper 159 enters into the notched groove 161 of the third rotatable disc 67, the projection stopper 158 abuts against the outer periphery of cylinder 66a of the second rotatable disc 66. FIG. 12A shows the condition when the tape cassette 6 is not mounted on the apparatus, and FIG. 12B shows the condition when the tape cassette 6 in. When the tape cassette 6 is inserted into the apparatus when it is in the state shown in FIG. 12A, the motor 24 rotates counter-clockwise to transmit its rotation to the driving gear 64. With the driving gear 64 starting its counter-clockwise rotation, the projection stopper 158 of the detent arm 157 enters into the notched groove 160 so as to restrain the second rotatable disc 66 from rotating. As a result, the retainer gear 85 engageable with the second rotatable disc 66 is also restrained from rotating, and the rotation of the driving gear 64 is transmitted through planetary gears 87 to the transmission gear 88 which only starts to rotate clockwise. And the third gear 67 engageable with the transmission gear 88 rotates counter-clockwise to drive the cassette loading means 505 to be discussed below. When the mounting of the tape cassette 6 is completed, the tape cassette 6 is locked by the tape cassette locking means (not shown), whereby the rotation of the third rotatable disc 67 is stopped. At this time, the phase of the third rotatable disc 67 is set up so that the notched groove 161 of the third rotatable disc 67 is positioned opposite to the projection stopper 159 of the detent arm 157 as shown in FIG. 12B. When the third rotatable gear 67 is stopped and the transmission gear 88 is restrained from rotating, the retainer gear 85 starts to rotate counter-clockwise by the rotation of the driving gear 64, and the second rotatable disc 66 which engages with the retainer gear 85 starts to rotate clockwise. The projection stopper 158 moves out of the notched groove 160 by the moment of the clockwise force around the shaft 156 generated by the rotatable driving force of the second rotatable disc 66 through the notched groove 160, so that the detent arm 157 starts turning clockwise around the shaft 156. At this time the projection stopper 159 enters into the notched groove 161 opposite to the projection stopper 159, whereby the third rotatable disc 67 is locked. Furthermore, when the driving gear 64 continues its counter-clockwise rotation, the second rotatable disc 66 rotates continuously, and the third rotatable disc 67 which drives the cassette loading means 505 remains locked by the projection stopper 159. In this way, changes are made from the cassette loading means 505 to the operating mode changing means 506 or to the tape loading means 508.

Figure 19:
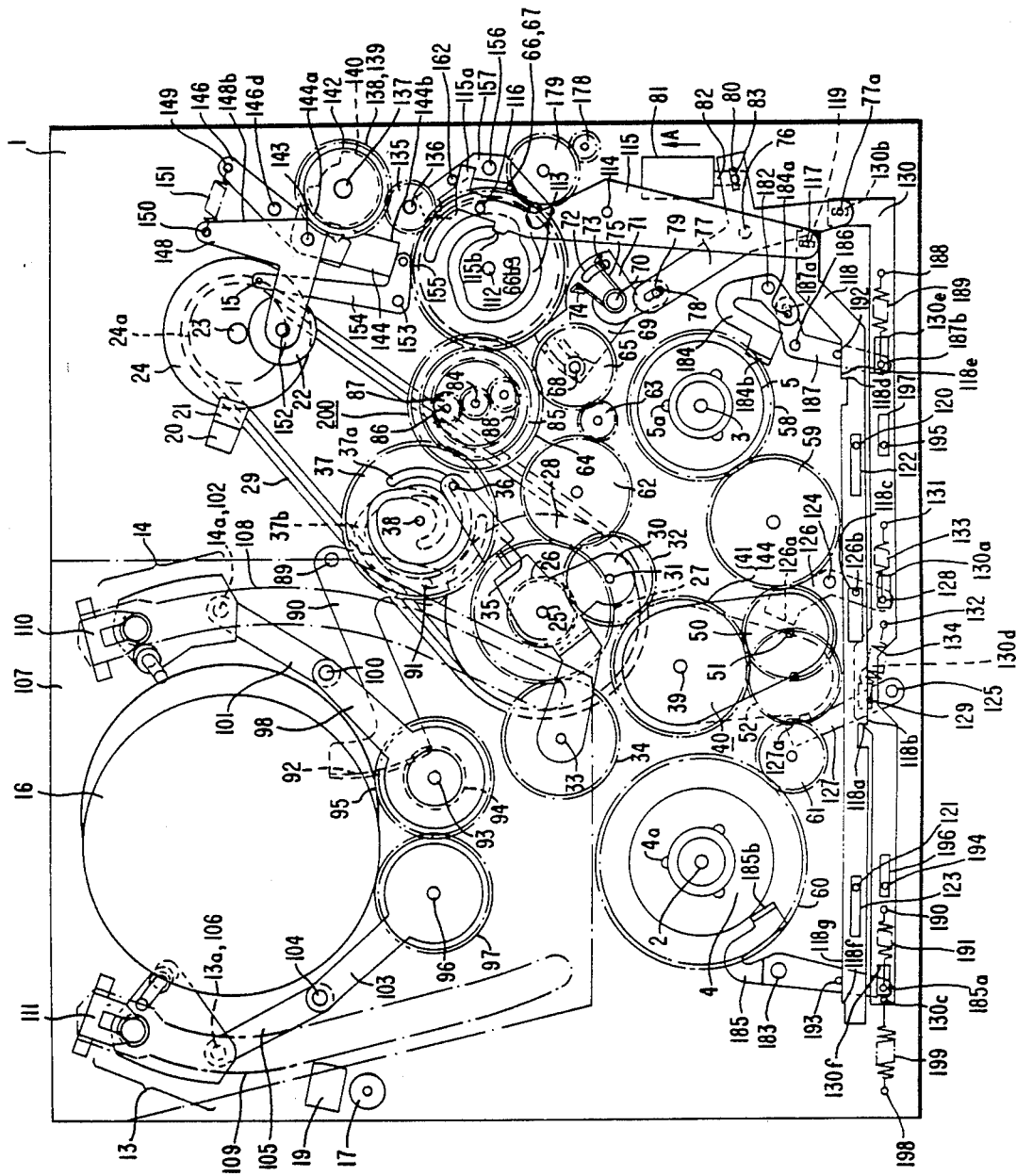
FIG. 19 is a schematic plan view of the apparatus in the state just before the recording/reproducing mode.

When the second rotatable disc 66 rotates through an angle of 360°, the cam follower 116 in engagement with the cam groove 113 of the second rotatable disc 66 moves rightwardly in FIG. 19 and a detent portion 115a provided at the end of the turnable arm 115 turns clockwise around the shaft 114. Since the detent arm 157 is restrained from turning by the detent portion 115a abutting against a stopper pin 162 fixed on the detent arm 157 as shown in FIG. 19, it is impossible for the projection stopper 158 to enter the notched groove 160 even when they are opposite to each other and the projection stopper 159 moves out of the notched groove 161.

The driving gear 64 rotates clockwise when the motor 24 reversely rotates clockwise so that the rotational driving force of the motor 24 is used for changing from the operating mode changing means 506 or the tape loading means 508 to the cassette loading means 505. The second rotatable disc 66 rotating counter-clockwise and the cam follower 116 moving leftwardly, a projection stopper 115b provided on the left side of the turnable arm 115 abuts against a pin 66b fixed on the second rotatable disc 66 to stop the rotation of the second rotatable disc 66 as shown in FIG. 2, at which time the projection stopper 158 and the notched groove 160 are positioned opposite to each other. When the retainer gear 85 in engagement with the second rotatable disc 66 stops, the transmission gear 88 starts to rotate counter-clockwise, and the third rotatable disc 67 starts to rotate clockwise. Hence the projection stopper 159 moves out of the notched groove 161 by the moment of the counter-clockwise force around the shaft 156 generated by the rotational driving force of the third rotatable disc 67 through the notched groove 161, whereby the detent arm 157 starts to turn counter-clockwise, at which time the projection stopper 158 opposite to the notched groove 160 enters into the notched groove 160 to lock the second rotatable disc 66. Furthermore, when the driving gear 64 continues to rotate clockwise, the second rotatable disc 66 is kept in the locked condition by the projection stopper 158 and only the third rotatable disc 67 rotates continuously, so that only the cassette loading means 505 is driven.

Next an explanation will be given of the cassette loading means 505 in FIG. 13 which shows a side view of this mechanism.

Bosses 164 and 165 provided respectively on the right and left sides of a cassette holder 163 move slidably along guide grooves 168 and 169 provided respectively in a righthand side plate 166 and a lefthand side plate 167 which are disposed upright on either side of the chassis, so that the cassette holder 163 holding the tape cassette 6 moves to mount the tape cassette 6 at a predetermined position of the apparatus. Righthand and lefthand wiper arms 170 and 171 in engagement with the bosses 164 and 165 respectively turn around shafts 172 and 173 respectively mounted on both side plates 166 and 167, a toothed portion 174 being provided on the outer periphery of the righthand wiper arm 170. The toothed portion 174 engages and rotates with a gear train consisting of gears 175 and 176 and a worm gear 177. A gear 178 fitted rotatably onto the same shaft as the worm gear 177 and rotating integrally with the worm gear 177 is geared through a gear 179 to the third rotatable disc 67 which also engages with the transmission gear 88 as shown in FIGS. 2 and 6A. When the transmission gear 88 rotates clockwise and the third gear 67 rotates counter-clockwise, both wiper arms 170 and 171 are consequently driven rotatably clockwise around shafts 172 and 173 respectively in FIG. 13. Also, the bosses 164 and 165 in engagement with the wiper arms 170 and 171 move slidably along the guide grooves 168 and 169 respectively, so that the tape cassette 6 and the cassette holder 163 move from the position "A" shown in dot-dash lines to the position of "B" shown in solid lines in FIG. 13. When the third rotatable disc 67 rotates clockwise, and the tape cassette 6 and the cassette holder 163 move from the position of "B" to that of "A" in FIG. 13. When the third rotatable disc 67 changes its rotary direction, the tape cassette 6 and the cassette holder 163 move in reciprocation between the position "A" and position "B". The front cover 180 provided in front of the tape cassette 6 is always biased to be closed by a spring and a locking member (not shown) inside of the tape cassette 6. When the tape cassette 6 is inserted into and held by the cassette holder 163, the front cover 180 is released from its locked condition by a releasing member (not shown) inside of the cassette holder 163 and abuts an opener 181 fixed on the chassis 1 as the cassette holder moves down perpendicularly to open the front cover 180. When the tape cassette 6 is in the position "B" in FIG. 13 which shows the condition in which it has been mounted, the front cover 180 opens high enough for tape guide posts 13 and 14 and the tape guide post 15 to draw out the magnetic tape 9. When the tape cassette 6 has been mounted at the predetermined position, the tape cassette 6 and the cassette holder 163 are locked by the tape cassette locking means (not shown) using, for instance, a self-locking of the worm gear 177.

Next an explanation will be given of the operations.

When the tape cassette 6 is inserted to the cassette holder 163 in FIGS. 2 and 13, the motor 24 rotates counter-clockwise with the solenoid 81 energized and the plunger 82 is retracted in the direction of the arrow A in FIG. 2, so that the turnable lever 77 turns counter-clockwise around the shaft 76 and the sub-rod 130 moves rightwardly in FIG. 2 against the tension force of the tension spring 199. With the movement of the sub-rod 130, the pins 187b and 185a move away from the notched edge surfaces 130e and 130f respectively, so that the brakes 184 and 185 are driven by the tension force of the tension springs 189 and 191 and the brake effect is applied to both reel turntables 5 and 4. The turnable idler gear 52 is also restrained from engaging rotatably with the idler gears 59 and 61. Simultaneously with the turnable arm 77 rotating counter-clockwise around the shaft 76, the first and second clutch plates 69 and 71 turn clockwise integrally with each other around the shaft 70, whereby the clutch gear 65 runs onto the upper surface 69a of the first clutch plate 69 and is changed from the condition as shown in FIG. 6A to that as shown in FIG. 6B. When the clutch gear 65 engages with the driving gear 64 as shown in FIG. 6B, the rotation of the motor 24 is transmitted to the clutch gear 65 and the driving gear 64 in engagement with the clutch gear 65 through the belt 29, the pulley 28, the first idler gear 62 and the second idler gear 63. At this time, when the projection stopper 158 enters into the notched groove 160 and the second rotatable disc 66 is restrained from rotating, the rotation of the driving gear 64 is transmitted only to the transmission gear 88, and the third rotatable disc 67 engageable with the transmission gear 88 rotates counter-clockwise in FIG. 2. As stated above, the rotation of the third rotatable disc 67 is transmitted to the toothed portion 174 integral with the righthand wiper arm 170 through the gears 179 and 178, the worm gear 177 and the gears 176 and 175, whereby the righthand wiper arm 170 rotates clockwise in FIG. 13 and both the tape cassette 6 and the cassette holder 163 are mounted at the predetermined position. Then the third rotatable disc is stopped from its rotation by the tape cassette 6 and the cassette holder 163 being locked by the tape cassette locking means (not shown). In other words, the rotational driving force of the motor 24 is transmitted to the cassette loading means 505 through the clutch means 503 and the driving selection means 504, and the plunger 82 drives the intermittently rotating means 512 and the controlling brake means 514.

Further, when the motor 24 continues its rotation, the projection stopper 158 moves out of the notching groove 160 and the projection stopper 159 enters into the notched groove 161, so that the third rotatable disc 67 is locked and both the first rotatable disc 37 and the second rotatable disc 66 engageable with the retainer gear 85 start to rotate clockwise respectively. When the first rotatable disc 37 rotates to an engle of 20°, the motor 24 stops its rotation and the apparatus is put into the stopping mode.

When a fast-forward-winding button (not shown) is pushed with the apparatus in the stopping mode as stated above, the motor 24 starts to rotate counter-clockwise simultaneously and the solenoid 81 is de-energized. With the solenoid 81 de-energized, the sub-rod 130 is moved leftwardly as shown in FIG. 16 by the tension force of the tension spring 199, and the pins 187b and 185a are respectively pushed leftwardly in FIG. 16 by the notch edge surfaces 130e and 130f, so that the brakes 184 and 185 are moved away from the reel turntables 5 and 4 respectively, and the braking effect is released to allow both reel turntables to rotate.

Figure 15:
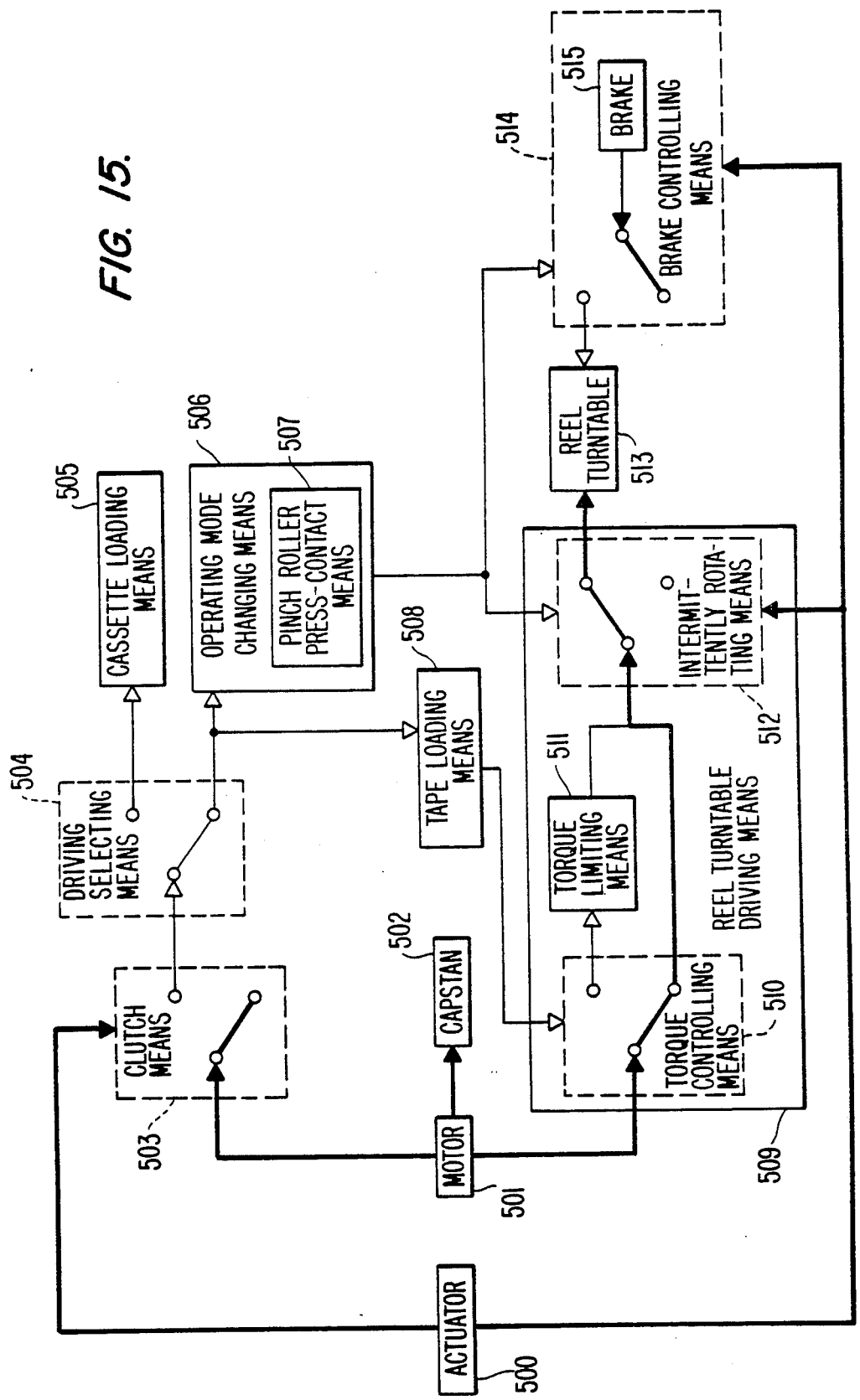
FIG. 15 is a block diagram of the apparatus in the fast-forward-winding mode.

When the pins 128 and 129 are also pushed leftwardly by the notch edge surfaces 130a and 130d of the sub-rod 130 respectively, the righthand stopper arm 126 turns clockwise around the shaft 124 and the lefthand stopper arm 127 turns counter-clockwise around the shaft 125, so that the turnable idler gear 52 is capable of rotatably engaging with the idler gear 59 at the take-up reel side. The turnable lever 77 turns clockwise around the shaft 76, and the clutch plates turn counter-clockwise integrally with each other around the shaft 70, so that the clutch gear 65 which is always biased downwardly in FIG. 6 by the compression spring 65a moves onto the lower face 69b from the upper face 69a of the first clutch plate 69 thereby being changed from the condition as shown in FIG. 6B to that as shown in FIG. 6A. As a result, the clutch gear 65 disengages from the driving gear 64 so that the first and second rotatable discs 37 and 66 are not driven. The rotation of the motor 24 is transmitted to the gear 34 through the belt 29 and the toothed portion 27 of the pulley 28 to cause the gear 34 to rotate clockwise and the lower part gear 44 to rotate counter-clockwise in FIG. 16. With the rotation of the lower part gear 44, the turnable arm 50 turns counter-clockwise to make the turnable idler gear 52 engageable with the idler gear 59 at the take-up reel side. Thus the counter-clockwise rotation of the motor 24 is transmitted to the take-up reel turntable 5, which rotates clockwise, and the magnetic tape 9 is wound on the take-up reel hub 8, so that the apparatus is in the fast-forward-winding mode. In this case the rotational driving force of the motor 24 is transmitted to the take-up reel turntable directly, not through the friction member 42 of the limiting torque member 40. In other words, the rotational driving force of the motor 24 is transmitted to both reel turntables 4 and 5 through the torque controlling means 510 and the intermittently rotating means 512 which are included in the reel turntable driving means 509, and the plunger 82 drives and controls, the clutch means 503, the intermittently rotating means 512 and the brake controlling means 514 as shown in FIG. 15 which is the block diagram of the apparatus in the fast-forward-winding mode.

Figure 14:
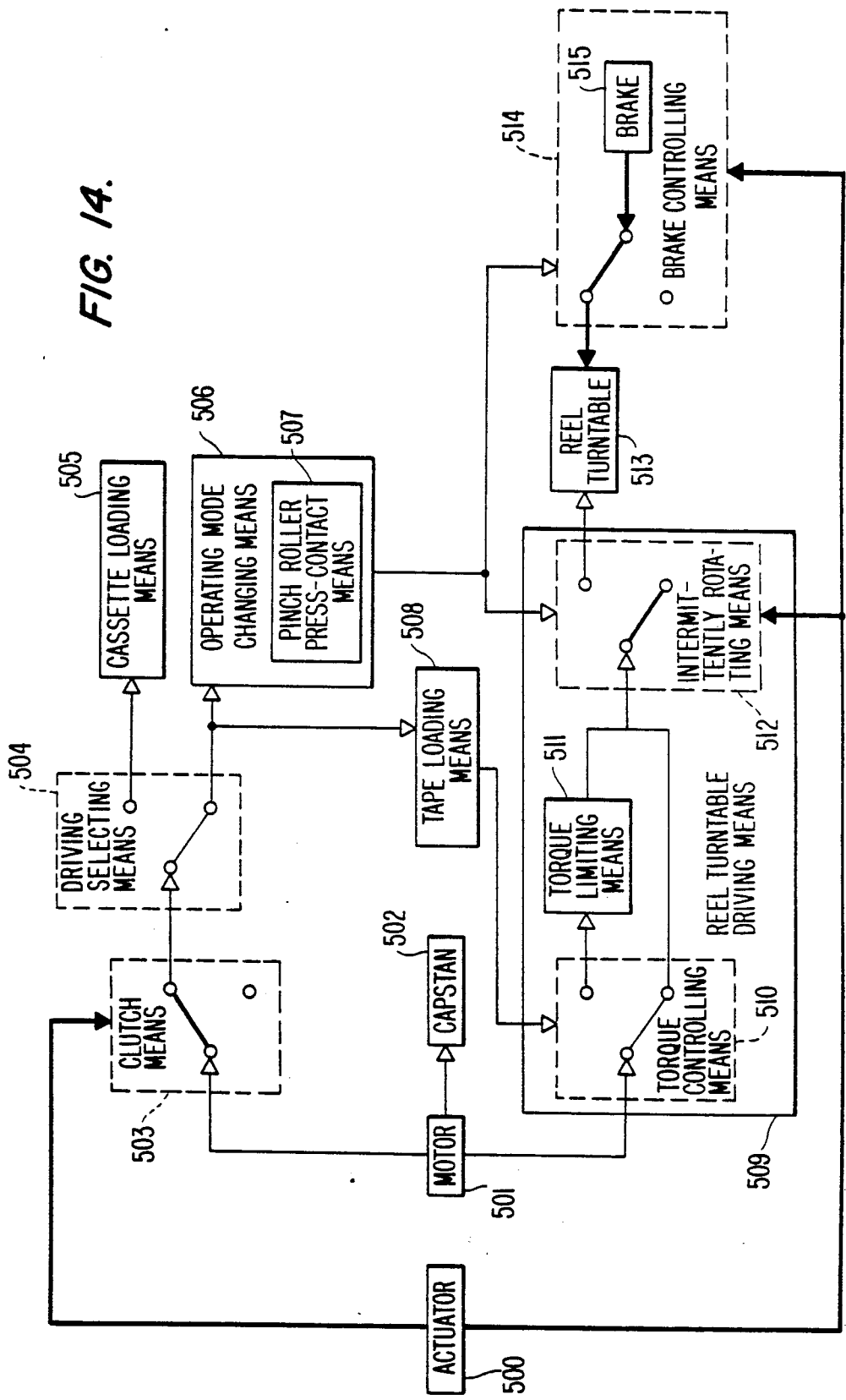
FIG. 14 is a block diagram of the apparatus in the stopping mode.

Next, the motor stops its rotation and the solenoid 81 is energized, either when a stopping button is pushed in the fast-forward-winding mode or when a transparent tape (not shown) attached to the end of the magnetic tape 9 is optically detected to generate a termination detecting signal. As stated above, the sub-rod 130 is moved leftwardly in FIG. 16 instantaneously when the solenoid 81 is energized, and the notch edge surface 130a of the sub-rod 130 pushes the pin 128 to turn the righthand stopper arm 126 counter-clockwise. The edge surface 126a of the righthand stopper arm 126 urges the shaft 51 to turn the turnable arm 50 counter-clockwise in FIG. 16, so that the turnable idler gear 52 disengages from the idler gear 59 and the take-up reel turntable 5 stops its rotation. The brakes 184 and 185 are driven simultaneously by the tension force of the tension springs 189 and 191 respectively, and the brake effect is applied to the both reel turntables 5 and 4 instantaneously. The clutch gear 65 runs onto the upper face 69a from the lower face 69b of the first clutch plate 69 of which condition is changed from that in FIG. 6A to that in FIG. 6B, thereby allowing the clutch gear 65 to engage with the driving gear 64 again as shown in FIG. 6B. Hence the apparatus is placed in the stopping mode as shown in FIG. 14.

The explanation of the operation in the rewinding mode is omitted, because it is almost the same as that in the fast-forward-winding mode described above, except that the rotational direction of the motor 24 is the opposite and that the supply reel turntable 4 is rotatably driven.

Figure 18:
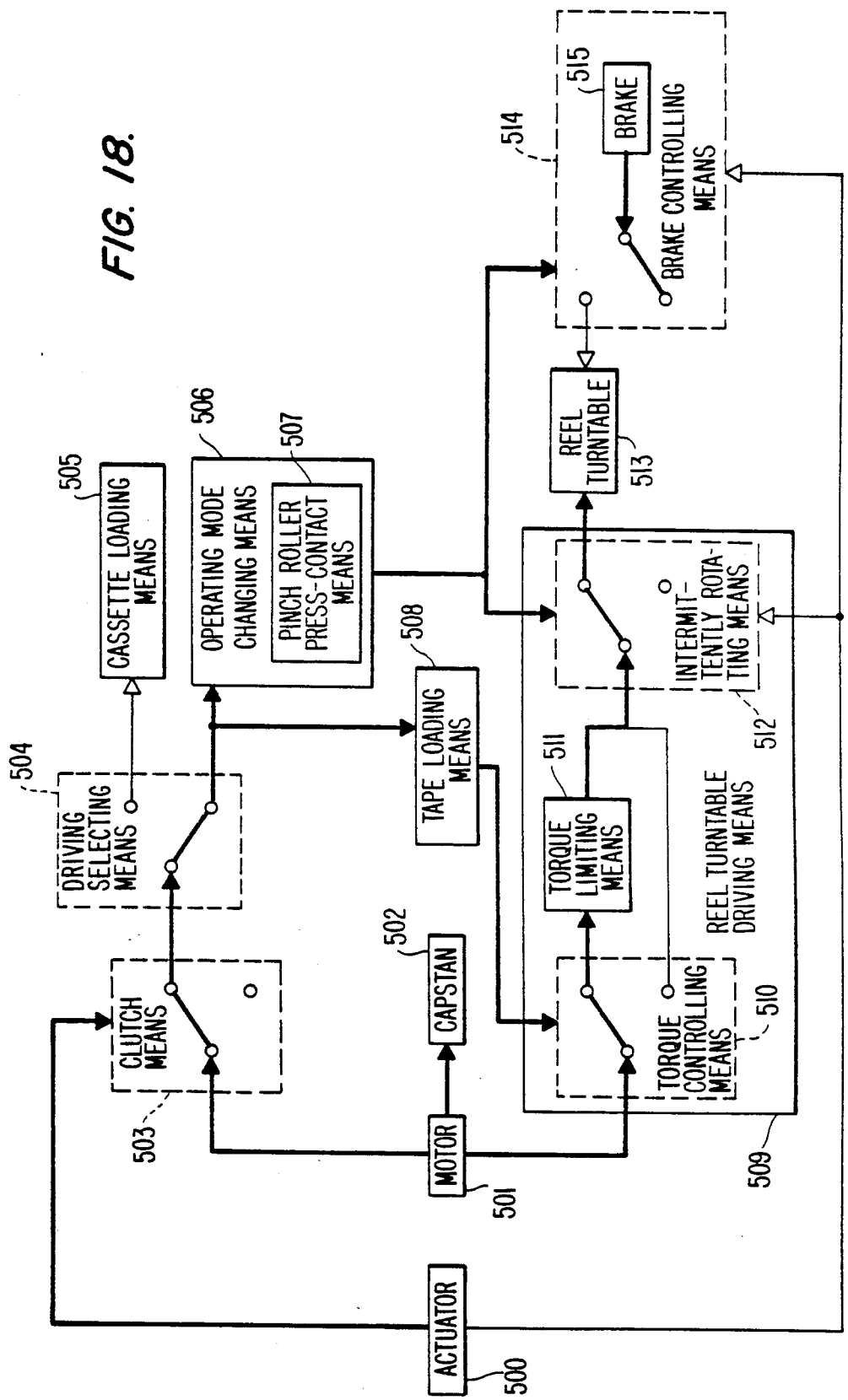
FIG. 18 is a block diagram of the apparatus in the state just before the recording/reproducing mode.

Next, when a recording and/or reproducing button (not shown) is pushed when the apparatus is in a stopping mode, the motor 24 rotates counter-clockwise with the solenoid 81 still energized. The rotation of the motor 24 is transmitted through the clutch gear 65 in engagement with the driving gear 64 and the retainer gear 85 to the first and second rotatable discs 37 and 66, both of which rotate clockwise in FIG. 17. The rotary angle of the second rotatable disc 66 is the same as that of the first rotatable disc 37 as shown in FIGS. 5A and 5B, because the second rotatable disc 66 has the same diameter and number of teeth as the first rotatable disc 37. When the second rotatable disc 66 rotates through an angle of 110°, the cam follower 116 is moved rightwardly in FIG. 17 by the cam grove 113 so that the main rod 118 is moved straight leftwardly in FIG. 17. And the kick pins 192 and 193 are pushed leftwardly by the notch edge surfaces 118d and 118f respectively, so that the brakes 184 and 185 move away from the reel turntables 5 and 4 to allow the braking effect to be released. The condition of the braking effect being released is held until the rotary angle of the second rotatable disc 66 becomes 440°. During this time, that condition is still kept, even if the plunger 82 and the sub-rod 130 are moved by energizing or de-energizing the solenoid 81. When the first rotatable disc 37 rotates to an angle of 120° with the rotation of the second rotatable disc 66, the first cam follower 36 is moved rightwardly in FIG. 17 by the cam groove 37a and the support plate 30 is turned clockwise around the shaft 25, whereby the gear 34 disengages from the lower part gear 44 and the gear 32 engages with the upper gear 41. The rotation of the upper gear 41 is transmitted to the lower part gear 44 and the turnable idler gear 52 through the friction member 42 of the torque limiting member 40. Although the turnable arm 50 turns clockwise at this time, the take-up reel turntable 5 never rotates because the turnable idler gear 52 is restrained from engaging with the idler gear 59 at the take-up reel side by the righthand stopper arm 126. When the second rotatable disc 66 continues to rotate to an angle of 150°, the cam follower 116 is moved rightwardly in FIG. 17 by the cam groove 113 and the turnable arm 115 is turned clockwise around the shaft 114, whereby the main rod 118 in engagement with the turnable arm 115 is moved leftwardly and the lefthand stopper arm 127 turns counter-clockwise around the shaft 125, so that the turnable idler gear 52 is capable of engaging with the idler gear 61 at the supply reel side. When the first rotatable disc 37 rotates to an angle of 150°, the sector gear 92 starts to rotate clockwise in FIG. 17 as stated above, whereby the tape loading means 508 is driven so that the tape guide posts 13 and 14 begin to draw the magnetic tape 9 out of the tape cassette 6. When the first and second rotatable discs 37 and 66 rotate to an angle of 170°, the driving member 138 rotates to an angle of 277° as shown in FIG. 5C, whereby the tape guide post 15 draws the magnetic tape 9, as shown in FIG. 14, out of the tape cassette 6 to the predetermined position, so that the tape guide post 15 is locked by the locking means (not shown). When the driving member 138 rotates to an angle of 277°, the pressure lever 146, the pinch roller arm 148 and the pinch roller 22 start to move down perpendicularly to the chassis 1, inside of the loop of the tape path formed by the tape guide post 15 drawing out the magnetic tape 9 as shown in dot-dash lines in FIG. 17. When the first rotatable disc 37 rotates to an angle of 280°, the tape guide posts 13 and 14 abut against the positioning members 110 and 111 respectively. When the first rotatable disc 37 rotates further to an angle of 300°, the tape guide posts 13 and 14 are brought into press-contact with the positioning member 110 and 111 with a predetermined strength. On the other hand, when the second rotatable gear 66 rotates from an angle of 298° to 323°, the cam follower 116 is moved further rightwardly, and the main rod 118 is moved leftwardly in FIG. 19, whereby the righthand stopper arm 126 turns, clockwise and the turnable idler gear 52 restrained from the engagement with the idler gear 59 at the take-up reel side is released, so that the turnable idler gear 52 engages with the idler gear 59 and the magnetic tape 9 is wound onto the take-up reel hub 8 without slacking by the take-up reel turntable 5 rotating clockwise. When the first and second rotatable discs 37 and 66 rotate to an angle of 323°, the driving member 138 rotates to an angle of 527° and the pinch roller 22 is positioned inside of the loop of the tape path of the magnetic tape 9 as shown in FIG. 11. Furthermore, when the driving member 138 rotates to an angle of 587°, the pinch roller 22 is brought into press-contact with the capstan 23 with a predetermined strength, and the magnetic tape 9 is transported at a constant speed by cooperation of the pinch roller with the capstan 23 which is rotatably and directly driven counter-clockwise by the brushless motor 24. In brief, as shown in FIG. 18, the rotational driving force of the motor 24 drives the operating mode changing means 506 and the tape loading means 508, and the plunger 82 drives only the clutch means 503.

When the first and second rotatable discs 37 and 66 rotate to an angle of 370° and the driving member 138 rotates at the same time to an angle of 604°, the clutch gear 65 disengages from the driving gear 64 when the solenoid 81 is de-energized, whereby the first rotatable disc 37, the second rotatable disc 66 and the driving member 138 stop their rotation and the rotation of the motor 24 is transmitted only to the capstan 23 and the take-up reel turntable 5. Hence the apparatus is placed in the recording and/or reproducing mode. In this way the magnetic tape 9 is loaded around the guide drum 16 and on the full track erase head 19, the audio erase head 20 and the audio & control head 21, and is wound on the take-up reel hub 8 without being slackened, so that the signals are recorded and/or reproduced on/from the magnetic tape 9. In brief, the rotational driving force of the motor 24 is transmitted to the reel turntable 513 through the torque limiting means 510 as shown in FIG. 20.

Next, when the stopping button is pushed in the recording and/or reproducing mode, the clutch gear 65 engages with the driving gear 64 and the solenoid 81 is energized as shown in FIG. 19 and the motor 24 rotates in the reverse direction, from counter-clockwise to clockwise, so as to rotate the first and second rotatable discs 37 and 66 counter-clockwise. With the counter-clockwise rotation of the second rotatable disc 66, the cam follower 116 is moved leftwardly and the main rod 118 is moved rightwardly in FIG. 19. When the first and second rotatable discs 37 and 66 rotate reversely to an angle of 150° and the driving member 138 rotates reversely to an angle of 244°, the tape guide posts 13, 14 and 15 and the pinch roller 22 return respectively to the positions shown in FIG. 16. The turnable arm 50 turns clockwise with the motor 24 rotating reversely clockwise and the turnable idler gear 52 engages with the idler gear 61 at the supply reel side, so that the supply reel turntable 4 rotates counter-clockwise and winds the discharged magnetic tape 9 onto the supply reel hub 7 without slackening the magnetic tape 9. When the second rotatable disc 66 rotates reversely over an angle of 150°, lefthand stopper arm 127 turns clockwise in FIG. 17 around the shaft 125 thereby disengaging the turnable idler gear 52 from the idler gear 61 at the supply reel side, so that the supply reel turntable 4 stops its rotation and the magnetic tape 9 completes being wound onto the supply reel hub 7. The brakes 184 and 185 abut against the reel turntables 5 and 4 respectively when the second rotatable disc 66 continues its reverse rotation to an angle of 110°, thereby applying the brake effect to the both reel turntables 5 and 4. When the first rotatable disc 37 rotates reversely to an angle of 120°, the support plate 30 turns counter-clockwise around the shaft 25, thereby disengaging the gear 32 from the upper gear 41 to allow the gear 34 to engage with the lower part gear 44. When the first and second rotatable discs 37 and 66 thereafter continue their reverse rotations to an angle of 20°, a switch (not shown) works to stop the motor 24 and the apparatus is placed in the stopping mode.

Furthermore, when an ejecting tape cassette button (not shown) is pushed, the projection stopper 159 moves out of the notched groove 161 of the third rotatable disc 67 and the projection stopper 158 enters into the notched groove 160 of the second rotatable disc 66, whereby the first and second rotatable discs 37 and 66 stop their rotations and the third rotatable disc 67 rotates clockwise in FIG. 2 so that the tape cassette 6 and the cassette holder 163 move from the position "B" to position "A" shown in FIG. 13 to eject the tape cassette 6 from the apparatus.

As seen from the above explanation, the present invention makes it possible to accomplish with only one motor the tape cassette loading operation, the tape loading operation, the operating mode changing operation and the magnetic tape transporting operation. For the above reason, the number of motors utilized in the apparatus is remarkably reduced thereby reducing the cost of the apparatus. Also, the apparatus has a low power consumption and light weight due to the use of only one motor.

The actuator comprises a plunger, so that its operation is quick in changing from the fast-forward-winding mode or rewinding mode to the stopping mode and so that it is possible to apply the brake effect instantaneously. Hence the braking action is so quick and ensured by detecting the end of the magnetic tape that the trouble of applying, exessive tension to the magnetic tape when its end is reached is eliminated.

Since the motor is a brushless motor with less torque variation and its spindle serves for the capstan, it minimizes the variation in the speed of the tape and also minimizes wow and flutter in the tape transport.

It must be also noticed that a thin (low profile) MTRR apparatus can be achieved by freely disposing the motor which drives the capstan directly at a position where it does not overlap the tape cassette.

What is claimed is:

1. A magnetic tape recording and/or reproducing apparatus for recording signals on and/or reproducing signals from a magnetic tape wound on reels in a tape cassette, comprising:
- tape transporting means comprising a capstan for transporting said magnetic tape at a constant speed in cooperation with a pinch roller;
- a single motor for driving said tape transporting means to rotate said capstan;
- cassette loading means for mounting said tape cassette at a predetermined position;
- tape loading means reciprocatable between an inoperative position where said magnetic tape is within said tape cassette and an operative position where said magnetic tape is drawn out of said tape cassette and loaded in a specific tape path;
- operating mode changing means for changing operating mode of said apparatus from one operating mode to another;
- tape winding means comprising a pair of reel turntables engageable with said reels for rotating said reels;
- reel turntable driving means for transmitting a rotational driving force of said motor to said tape winding means to rotate said reel turntables;
- clutch means connected to said motor for transmitting intermittently the rotational driving force of said motor;
- an actuator connected to said clutch for driving said clutch means; and
- driving selecting means connectable between said clutch and said cassette loading means; said tape loading means and said operating mode changing means for transmitting the rotational driving force of said motor from said clutch means selectively to said cassette loading means or to said tape loading means and said operating mode changing means,
- whereby said cassette loading means, said tape loading means, said operating mode changing means, said tape transporting means, and said tape winding means are driven by said single motor.

2. The apparatus according to claim 1, wherein said driving selecting means is simultaneously connected to said operating mode changing means, and said tape loading means.

3. The apparatus according to claim 1, further comprising brake controlling means having a brake for applying a brake effect to said reel turntables and to which said actuating means is connected for operating said brake controlling means and said operating mode changing means simultaneously to, when said tape loading means is in said inoperative position, cause said actuator to actuate said brakes, and for, when said operating mode changing means is actuated to change said tape loading means to the operative position, not to apply said brake effect to said reel turntables regardless of the condition of said actuator.

4. The apparatus according to claim 1, wherein said operating mode changing means comprises a cam driven by said motor for changing the operating mode of said apparatus and an operation member driven by said cam to move to plural positions corresponding to plural operating modes of said apparatus.

5. The apparatus according to claim 1, wherein said reel turntable driving means comprises intermittently rotating means which transmits said rotational driving force of said motor intermittently to said reel turntables.

6. The apparatus according to claim 1, wherein said reel turntable driving means comprises torque controlling means by which a driving torque for said reel turntables from said motor is controlled to be larger when said tape loading means is in said inoperative position than when in said operative position.

7. The apparatus according to claim 6, further comprising a rotatable disc having a tape loading cam for driving said tape loading means.

8. The apparatus according to claim 7, wherein said torque controlling means is driven by said rotatable disc having said tape loading cam.

9. The apparatus according to claim 1, wherein said motor is a brushless motor.

10. The apparatus according to claim 9, wherein said motor has a spindle which constitutes said capstan.

11. The apparatus according to claim 1, wherein said operating mode changing means comprises a pinch roller press-contact means for pressing said pinch roller to said capstan with said magnetic tape therebetween, said pinch roller press-contact means comprising a driving member which reciprocates said pinch roller between a first position where said pinch roller does not hinder said tape loading means from drawing out said magnetic tape and a second position inside a tape loop of said magnetic tape drawn out of said tape loading means and drives said pinch roller to a third position where said pinch roller is brought into press-contact with said capstan with said magnetic tape therebetween.

12. The apparatus according to claim 1, wherein said driving selecting means comprises: a differential gear mechanism including a first rotatable disc connected to said cassette loading means and a second rotatable disc connected to both said tape loading means and said operating mode changing means; and a locking means for selectively locking one of said first and second rotatable discs.

* * * * *